(12) United States Patent
Yano et al.

(10) Patent No.: US 8,640,003 B2
(45) Date of Patent: *Jan. 28, 2014

(54) RADIO BASE STATION FOR PERFORMING RADIO COMMUNICATION WITH MOBILE STATION

(71) Applicant: Fujitsu Limited, Kawasaki (JP)

(72) Inventors: Tetsuya Yano, Kawasaki (JP); Kazuhisa Obuchi, Kawasaki (JP); Tsuyoshi Shimomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,306

(22) Filed: Apr. 25, 2013

(65) Prior Publication Data
US 2013/0235832 A1     Sep. 12, 2013

Related U.S. Application Data

(60) Division of application No. 12/689,620, filed on Jan. 19, 2010, now Pat. No. 8,453,028, which is a continuation of application No. PCT/JP2007/065786, filed on Aug. 10, 2007.

(51) Int. Cl.
  *H03M 13/00*        (2006.01)
(52) U.S. Cl.
  USPC .......................... 714/758; 714/748; 370/329
(58) Field of Classification Search
  USPC ........................ 714/748, 752, 758; 370/329
  See application file for complete search history.

(56) References Cited

U.S. PATENT DOCUMENTS

| 7,339,919 | B2 |   | 3/2008  | Harada |
| 7,510,082 | B2 |   | 3/2009  | Kimura et al. |
| 7,519,082 | B2 | * | 4/2009  | Quigley et al. ............... 370/468 |
| 7,821,954 | B2 | * | 10/2010 | Quigley et al. ............... 370/252 |
| 7,843,847 | B2 | * | 11/2010 | Quigley et al. ............... 370/252 |
| 7,873,006 | B2 | * | 1/2011  | Yi et al. ....................... 370/329 |
| 7,894,395 | B2 | * | 2/2011  | Yi et al. ....................... 370/329 |
| 7,916,775 | B2 | * | 3/2011  | Kim et al. .................... 375/220 |

(Continued)

FOREIGN PATENT DOCUMENTS

| EP | 1 873 948    | 1/2008 |
| JP | 2005-244819  | 9/2005 |

(Continued)

OTHER PUBLICATIONS

Japanese Office Action issued for corresponding Japanese Patent Application No. 2009-527991, dated Jun. 5, 2012, with partial English translation.

(Continued)

*Primary Examiner* — Esaw Abraham
(74) *Attorney, Agent, or Firm* — Myers Wolin, LLC

(57) ABSTRACT

A mobile station for performing radio communication with a radio base station, the mobile station includes an information generation section which generates information indicative of a result of error detection on a downlink signal received; and a sending section which sends the information via a physical uplink control channel, and sends uplink data via a physical uplink shared channel at a different transmission frequency from the physical uplink control channel and in a same transmission time period as the physical uplink control channel; whereby the information generation section and the sending section operate when the mobile station receives downlink scheduling information and uplink allocation grant in a same subframe.

2 Claims, 32 Drawing Sheets

(56) References Cited

U.S. PATENT DOCUMENTS

| | | | |
|---|---|---|---|
| 7,953,013 B2* | 5/2011 | Miyoshi | 370/241 |
| 8,036,101 B2* | 10/2011 | Kim et al. | 370/216 |
| 8,107,394 B2* | 1/2012 | Kim et al. | 370/252 |
| 8,149,766 B2* | 4/2012 | Laroia et al. | 370/328 |
| 8,184,570 B2* | 5/2012 | Chun et al. | 370/312 |
| 8,204,450 B2* | 6/2012 | Rudolf et al. | 455/69 |
| 2006/0018347 A1 | 1/2006 | Agrawal | |
| 2006/0062217 A1 | 3/2006 | Kim et al. | |
| 2007/0047474 A1 | 3/2007 | Anderson | |
| 2008/0192705 A1 | 8/2008 | Suzuki | |
| 2010/0188982 A1 | 7/2010 | Kato et al. | |

FOREIGN PATENT DOCUMENTS

| | | |
|---|---|---|
| JP | 2005-252980 | 9/2005 |
| JP | 4734621 | 7/2011 |
| WO | 03/096581 | 11/2003 |
| WO | 2006/031073 | 3/2006 |
| WO | 2006/109436 | 10/2006 |
| WO | 2006/114855 | 11/2006 |
| WO | 2007/023022 | 3/2007 |

OTHER PUBLICATIONS

Japanese Patent Office Action issued for corresponding Japanese Patent Application No. 2009-527991, dated Sep. 4, 2012, with English translation.

The Second Notification of Office Action issued for corresponding Chinese Patent Application No. 200780100011.5, issued Jan. 17, 2013, with English translation.

Russian Patent Office Office Action "Questions, Arguments, Objections, Proposals" issued for corresponding Russian Application No. 2010108233, issued Dec. 27, 2010, with English translation.

Patent Examination Report No. 2 issued for corresponding Australian Patent Application No. 2011202139, dated Aug. 6, 2012.

The extended European search report includes the supplementary European search report and the European search opinion issued for corresponding European Patent Application No. 07792429.8., dated Feb. 21, 2013.

International Search Report for corresponding International Patent Application No. PCT/JP2007/065786, mailed Oct. 16, 2007.

NEC Group, NTT DoCoMo; "Downlink ACK/NACK Mapping for E-UTRA"; Agenda Item: 6.3.3; No. R1-061884; TSG-RAN WG1 LTE AdHoc, Cannes, France; Jun. 27-30, 2006.

Nokia Siemens Networks, Nokia; "UL/DL resource allocation signaling errors and their impact to UL multiplexing design"; Agenda item: 7.13.2; Document for: Discussion and decision; No. R1-072312; 3GPP TSG RAN WG1 Meeting #49, Kobe, Japan, May 7-11, 2007.

Ericsson; "Multiple CQI formats"; Agenda Item: 5.13.2.; Document for: Discussion and Decision; No. R1-073055; TSG-RAN WG1 #49bis, Orlando, Jun. 25-29, 2007.

Qualcomm Europe; "Multiplexing of Sounding RS and PUCCH"; Agenda Item: 5.13.2; 3GPP TSG RAN1 #49-bis; R1-072756; Orlando, USA; Jun. 25-29, 2007.

Samsung; "HARQ symbol to RE mapping"; Agenda Item: 5.5; Document for: Discussion and Decision; No. R1-073128; 3GPP TSG RAN WG1 Meeting #49bis, Orlando, FL, USA, Jun. 25-29, 2007.

Office Action issued by the United States Patent and Trademark Office for corresponding U.S. Appl. No. 13/869,667, electronically delivered on Jul. 15, 2013.

Office Action issued for corresponding Japanese Patent Application No. 2012-173514, dated Jul. 16, 2013, with a partial English translation.

* cited by examiner

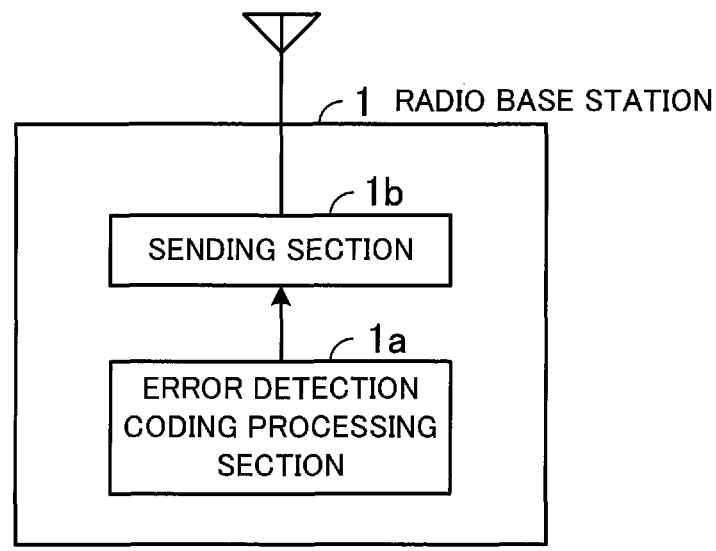
MOBILE STATION
FIG. 1

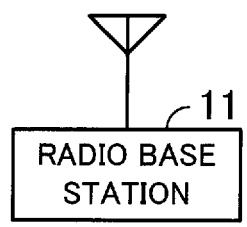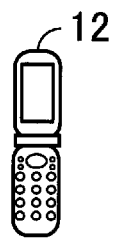
FIG. 2

RADIO BASE STATION FOR PERFORMING RADIO COMMUNICATION WITH MOBILE STATION

This application is a Division of U.S. application Ser. No. 12/689,620, filed Jan. 19, 2010, now issued as U.S. Pat. No. 8,453,028 on May 28, 2013, which is a continuation of International Application No. PCT/JP2007/065786, filed Aug. 10, 2007, the contents of each are herein wholly incorporated by reference.

FIELD

The embodiments discussed herein are related to a radio base station and a mobile station.

BACKGROUND

When a radio base station sends downlink data, the radio base station sends information regarding assignment of a radio resource used for sending the downlink data and downlink scheduling information, such as a transmission format, to a mobile station which is the destination of the downlink data via a PDCCH (Physical Downlink Control Channel). The radio base station performs coding and modulation of the downlink data, mapping of the downlink data to the radio resource, and the like in accordance with the designated downlink scheduling information and sends the downlink data via a PDSCH (Physical Downlink Shared Channel). The mobile station determines whether a PDCCH the destination of which is the mobile station is included in (candidate) PDCCHs. If the mobile station detects a PDCCH the destination of which is the mobile station, then the mobile station decodes the PDCCH and receives the PDSCH and the downlink data on the basis of the downlink scheduling information included in the PDCCH.

FIG. 26 illustrates PDCCHs and PDSCHs. A 1-millisecond subframe is illustrated in FIG. 26. In FIG. 26, a vertical direction indicates a frequency and a horizontal direction indicates time.

As illustrated in FIG. 26, physical downlink control channels (PDCCHs) i, j, and k and physical downlink shared channels (PDSCHs) i, j, and k are assigned to frequency domains and time domains. It is assumed that a PDCCH the destination of which is a mobile station is the PDCCH j. In this case, the mobile station receives the PDCCH j the destination of which is the mobile station, and receives data sent via the PDSCH j on the basis of the PDCCH j received.

A mobile station detects a PDCCH the destination of which is the mobile station, and receives downlink data. The mobile station then detects an error in the downlink data. If the mobile station does not detect an error in the downlink data, then the mobile station returns ACK (ACKnowledgement) to a radio base station. If the mobile station detects an error in the downlink data, then the mobile station sends NACK (Negative ACK) to the radio base station. If the radio base station receives the ACK, then the radio base station sends the next data. If the radio base station receives the NACK, then the radio base station resends the data sent previously.

FIG. 27 illustrates the sending of downlink data and a response thereto. In FIG. 27, downlink data which a radio base station sends to a mobile station and ACK or NACK which the mobile station sends to the radio base station are indicated.

As illustrated in FIG. 27, the radio base station sends downlink data to the mobile station. The mobile station detects an error in the downlink data received. If the mobile station does not detect an error in the downlink data received, then the mobile station sends ACK to the radio base station. On the other hand, if the mobile station detects an error in the downlink data received, then the mobile station sends NACK to the radio base station as illustrated in FIG. 27. In this case, as illustrated in FIG. 27, the radio base station resends the downlink data which the radio base station sent previously.

When the mobile station sends uplink data, the radio base station sends UL allocation grant used for sending the uplink data to the mobile station which sends the uplink data via a PDCCH. The mobile station uses a radio resource designated by the radio base station for sending the uplink data. There is a case where ACK or NACK as a response to the sending of downlink data is to be sent. In such a case, the mobile station multiplexes the ACK or NACK and the uplink data and sends the ACK and NACK by the use of part of the radio resource assigned for sending the uplink data.

FIG. 28 illustrates UL allocation grant and uplink data sent on the basis thereof. FIG. 28 illustrates UL allocation grant which a radio base station sends to a mobile station and uplink data which the mobile station sends to the radio base station.

The radio base station sends the UL allocation grant indicated in FIG. 28 to the mobile station via a PDCCH. The mobile station sends the uplink data on the basis of the UL allocation grant sent from the radio base station.

A method for sending ACK or NACK information as a response to the sending of downlink data depends on whether the mobile station sends uplink data. That is to say, there are two methods for sending ACK or NACK information as a response to the sending of downlink data. The case where the mobile station does not send uplink data will be described first.

FIG. 29 is a view for describing a method for sending ACK or NACK in the case of uplink data not being sent. FIG. 29 illustrates a PUCCH (Physical Uplink Control Channel) sent from the mobile station to the radio base station. If the mobile station does not send uplink data, then the mobile station sends ACK or NACK via a PUCCH which is assigned thereto in advance (or which is associated with a radio resource via which the downlink data is sent). In FIG. 29, the frequencies of PUCCHi and PUCCHj change by the slot (0.5 ms). The reason for this is to obtain a frequency diversity effect.

The case where the mobile station sends uplink data will be described next.

FIG. 30 is a view for describing a method for sending ACK or NACK in the case of uplink data being sent. FIG. 30 illustrates a PUSCH (Physical Uplink Shared Channel) assigned by a PDCCH (UL allocation grant sent via a PDCCH).

As illustrated in FIG. 30, if a PUSCH is assigned, then the mobile station time-multiplexes the uplink data and the ACK or NACK and sends them to the radio base station (see, for example, R1-073128, "HARQ symbol to RE mapping", 3GPP TSG RAN WG1 Meeting #49bis, Orlando, Fla., USA, Jun. 25-29, 2007).

With the above ACK or NACK sending method, however, an uplink data format which the radio base station expects does not match the format of uplink data which is actually sent by the mobile station. As a result, the radio base station may be unable to receive the uplink data properly.

FIG. 31 is a view for describing a format mismatch (part 1). FIG. 31 illustrates downlink scheduling information 301, UL allocation grant 302, and downlink data 303 sent from a radio base station to a mobile station, and uplink data 304 sent from the mobile station to the radio base station. Forward error correction coding has been performed separately on the downlink scheduling information 301 and the UL allocation grant 302.

In FIG. 31, it is assumed that the mobile station fails to detect the downlink scheduling information 301 and that the mobile station succeeds in detecting the UL allocation grant 302. In this case, the mobile station fails to detect the downlink scheduling information 301, so the mobile station does not perform the process of receiving the downlink data 303. On the other hand, the mobile station succeeds in detecting the UL allocation grant 302, so the mobile station sends the uplink data 304 to the radio base station as illustrated in FIG. 31.

The mobile station does not perform the process of receiving the downlink data 303, so the mobile station does not perform error detection on the downlink data 303. Therefore, as illustrated in FIG. 31, the mobile station does not multiplex the uplink data 304 and ACK or NACK and sends only the uplink data 304 to the radio base station.

FIG. 32 is a view for describing a format mismatch (part 2). Elements in FIG. 32 that are the same as those illustrated in FIG. 31 are marked with the same symbols and descriptions of them will be omitted.

In FIG. 32, it is assumed that the mobile station succeeds in detecting downlink scheduling information 301 and UL allocation grant 302. In this case, the mobile station receives downlink data 303, so the mobile station performs error detection on the downlink data 303, multiplexes uplink data 304 and ACK or NACK 305, and sends them to the radio base station.

In the case of FIG. 31, only the uplink data 304 is sent. In the case of FIG. 32, the uplink data 304 and the ACK or NACK 305 are multiplexed and are sent. If uplink data and ACK or NACK are multiplexed and are sent to the radio base station, then a PUSCH transmission format which the radio base station expects does not match a PUSCH transmission format which the mobile station actually uses for sending.

That is to say, when the radio base station sends downlink data, the mobile station may fail to detect downlink scheduling information and succeed in detecting UL allocation grant. In this case, though the mobile station needs to multiplex uplink data and ACK or NACK and send them, the mobile station sends only the uplink data. As a result, the radio base station may not be able to receive the uplink data correctly.

SUMMARY

According to an aspect of the invention, a radio base station for sending a mobile station first control data to be used for receiving a downlink signal and second control data to be used for sending an uplink signal includes: an error detection coding processing section which performs an error detection coding process with data including both the first control data and the second control data as a unit; and a sending section which sends the mobile station data on which the error detection coding process has been performed by the error detection coding processing section.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWING(S)

FIG. 1 is a view for giving an overview of a radio base station;

FIG. 2 illustrates an example of the structure of a radio system according to a first embodiment;

DESCRIPTION OF EMBODIMENT(S)

Figure 3:
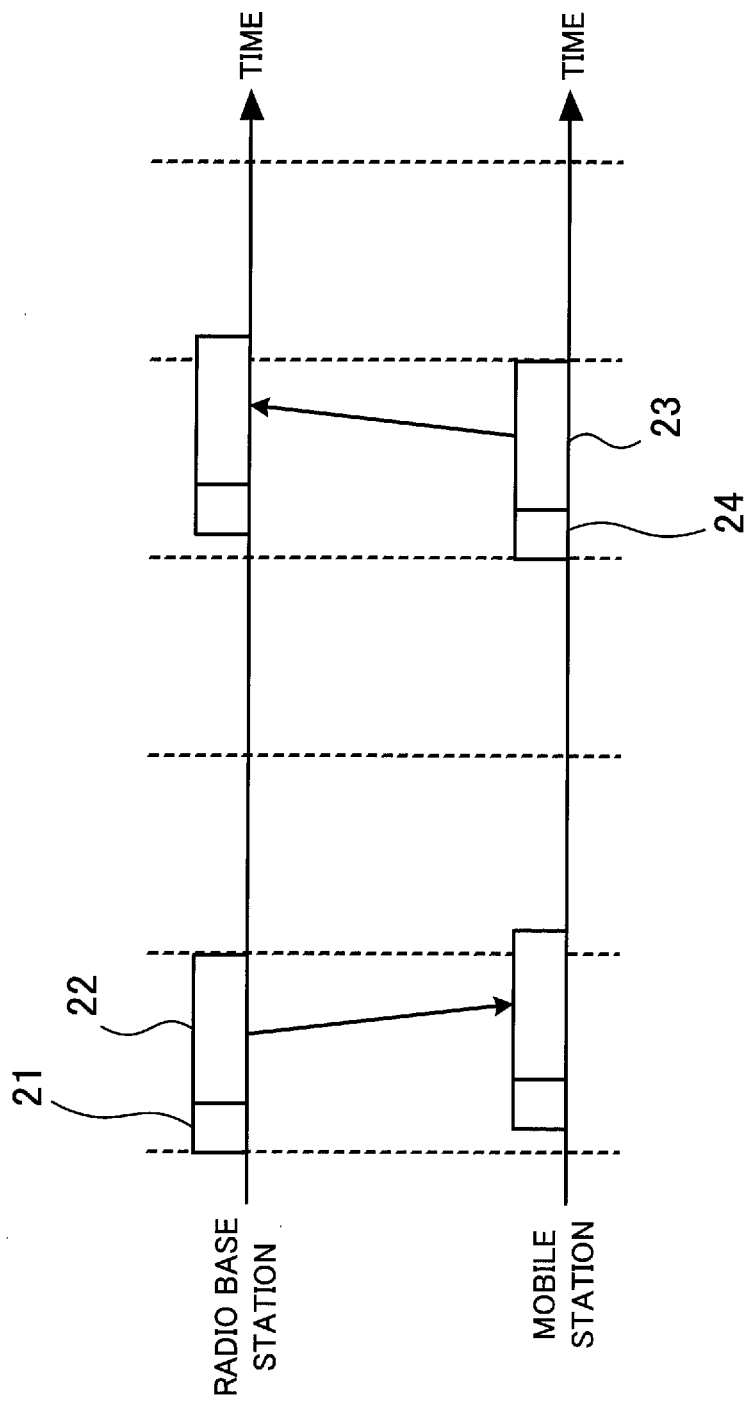
FIG. 3 illustrates the operation of a radio base station and a mobile station performed in the case of succeeding in detecting a PDCCH.

Preferred embodiments of the present invention will be described below with reference to the accompanying drawings.

FIG. 1 is a view for giving an overview of a radio base station. As illustrated in FIG. 1, a radio base station 1 includes an error detection coding processing section 1a and a sending section 1b. The radio base station 1 sends a mobile station 2 first control data which the mobile station 2 needs to receive a downlink signal and second control data which the mobile station 2 needs to send an uplink signal. The first control data is, for example, downlink scheduling information sent via a PDCCH. The second control data is, for example, UL allocation grant sent via a PDCCH.

The error detection coding processing section 1a performs an error detection coding process with data including both the first control data and the second control data as a unit. That is to say, the error detection coding processing section 1a does not perform an error detection coding process separately on the first control data and the second control data but performs an error detection coding process on the first control data and the second control data in block.

The sending section 1b sends the mobile station 2 the first control data and the second control data on which the error detection coding process has been performed by the error detection coding processing section 1a.

As stated above, the radio base station 1 performs the error detection coding process with data including both the first control data and the second control data as a unit. Therefore, the case where the mobile station 2 detects an error only in the first control data or the second control data or the case where the mobile station 2 succeeds in receiving only the first control data or the second control data does not arise. For example, if there is an error in the first control data, then the mobile station 2 detects an error both in the first control data and in the second control data. Accordingly, the mobile station 2 fails to detect the second control data.

As a result, the case where the mobile station 2 fails to receive the first control data, where the mobile station 2 succeeds in receiving the second control data and sends the radio base station 1 an uplink signal on the basis of the second control data does not arise. That is to say, the mobile station 2 succeeds in receiving both the first control data and the second control data and sends an uplink signal including a result of error detection on a downlink signal. Accordingly, a format mismatch does not occur in data received by the radio base station 1. As a result, the radio base station 1 can receive the uplink signal properly.

A first embodiment of the present invention will now be described in detail with reference to the accompanying drawings.

FIG. 2 illustrates an example of the structure of a radio system according to a first embodiment. FIG. 2 illustrates a radio base station 11 and a mobile station 12. Radio communication is performed between the radio base station 11 and the mobile station 12 illustrated in FIG. 2 on the basis of, for example, LTE (Long Term Evolution).

The radio base station 11 encodes downlink scheduling information and UL allocation grant in block and sends them via a PDCCH.

The mobile station 12 detects a PDCCH the destination of which is the mobile station 12. It is assumed that the mobile station 12 succeeds in detecting a PDCCH the destination of which is the mobile station 12 and that downlink scheduling information and UL allocation grant are included in the PDCCH detected. Then the mobile station 12 receives downlink data and detects an error in the downlink data. The mobile station 12 then multiplexes uplink data and ACK or NACK corresponding to a result of error detection on the downlink data and sends them via a PUSCH based on the UL allocation grant. On the other hand, if the mobile station 12 fails to detect a PDCCH the destination of which is the mobile station 12, then the mobile station 12 sends nothing via a PUSCH.

The downlink scheduling information and the UL allocation grant are encoded in block and are sent to the mobile station 12. Therefore, the case where the mobile station 12 succeeds in detecting one of them and fails to detect the other does not arise. That is to say, unlike the case of FIG. 31, the mobile station 12 does not send the radio base station 11 only the uplink data 304. As a result, a format mismatch does not occur in data received by the radio base station 11.

FIG. 3 illustrates the operation of the radio base station and the mobile station performed in the case of succeeding in detecting a PDCCH. In FIG. 3, control information 21 and downlink data 22 are indicated. In addition, uplink data 23 and ACK or NACK 24 time-multiplexed therewith are indicated.

The control information 21 is obtained by coding downlink scheduling information and UL allocation grant in block. The radio base station 11 sends the control information 21 via a PDCCH. The radio base station 11 also sends the downlink data 22 via a PDSCH.

The mobile station 12 succeeds in detecting the control information 21 and receives the downlink data 22 on the basis of the downlink scheduling information included in the control information 21. The mobile station 12 detects an error in the downlink data 22 received. In addition, the mobile station 12 sends the radio base station 11 the uplink data 23 on the basis of the UL allocation grant. The mobile station 12 multiplexes the uplink data 23 and the ACK or NACK 24 which is a result of error detection on the downlink data 22, and sends them to the radio base station 11.

Figure 4:
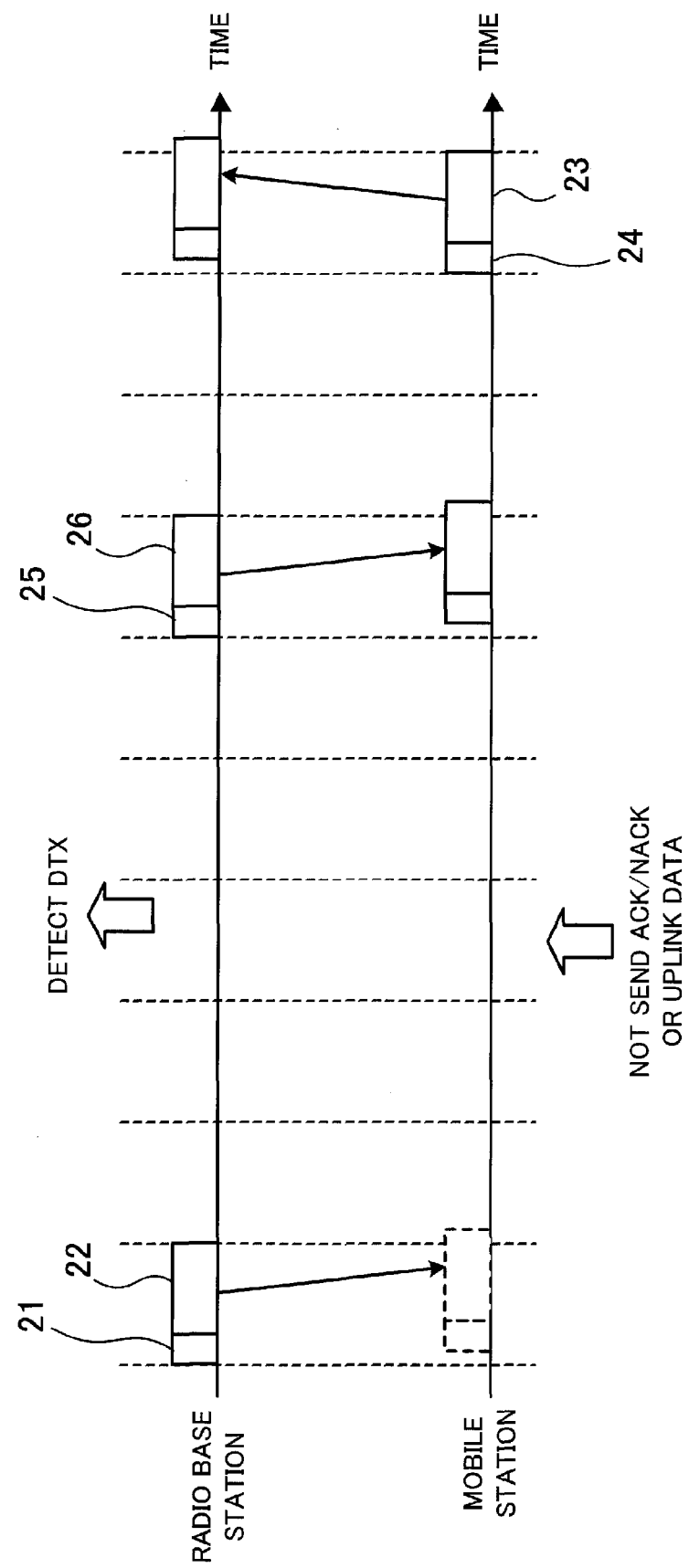
FIG. 4 illustrates the operation of the radio base station and the mobile station performed in the case of failing to detect a PDCCH.

FIG. 4 illustrates the operation of the radio base station and the mobile station performed in the case of failing to detect a PDCCH. Elements in FIG. 4 that are the same as those illustrated in FIG. 3 are marked with the same symbols and descriptions of them will be omitted.

The radio base station 11 sends control information 21 obtained by coding downlink scheduling information and UL allocation grant in block via a PDCCH. The radio base station 11 also sends downlink data 22 via a PDSCH.

It is assumed that the mobile station 12 fails to detect the control information 21 including the downlink scheduling information and the UL allocation grant. In this case, the mobile station 12 may not be able to detect the downlink scheduling information, so the mobile station 12 does not perform the process of receiving the downlink data 22. In addition, the mobile station 12 may not be able to detect the UL allocation grant, so the mobile station 12 does not perform the process of sending uplink data.

Though the radio base station 11 sends the downlink data 22 via the PDSCH, the radio base station 11 receives nothing from the mobile station 12. Accordingly, the radio base station 11 detects DTX indicative that an ACK or NACK signal is not sent. If the radio base station 11 detects the DTX, then the radio base station 11 resends the mobile station 12 the downlink data 22 previously sent. This is indicated by control information 25 and downlink data 26 in FIG. 4.

If the mobile station 12 can detect the downlink data 26 resent, then the mobile station 12 sends uplink data 23 and ACK or NACK 24 to the radio base station 11. This is the same with FIG. 3.

Figure 31:
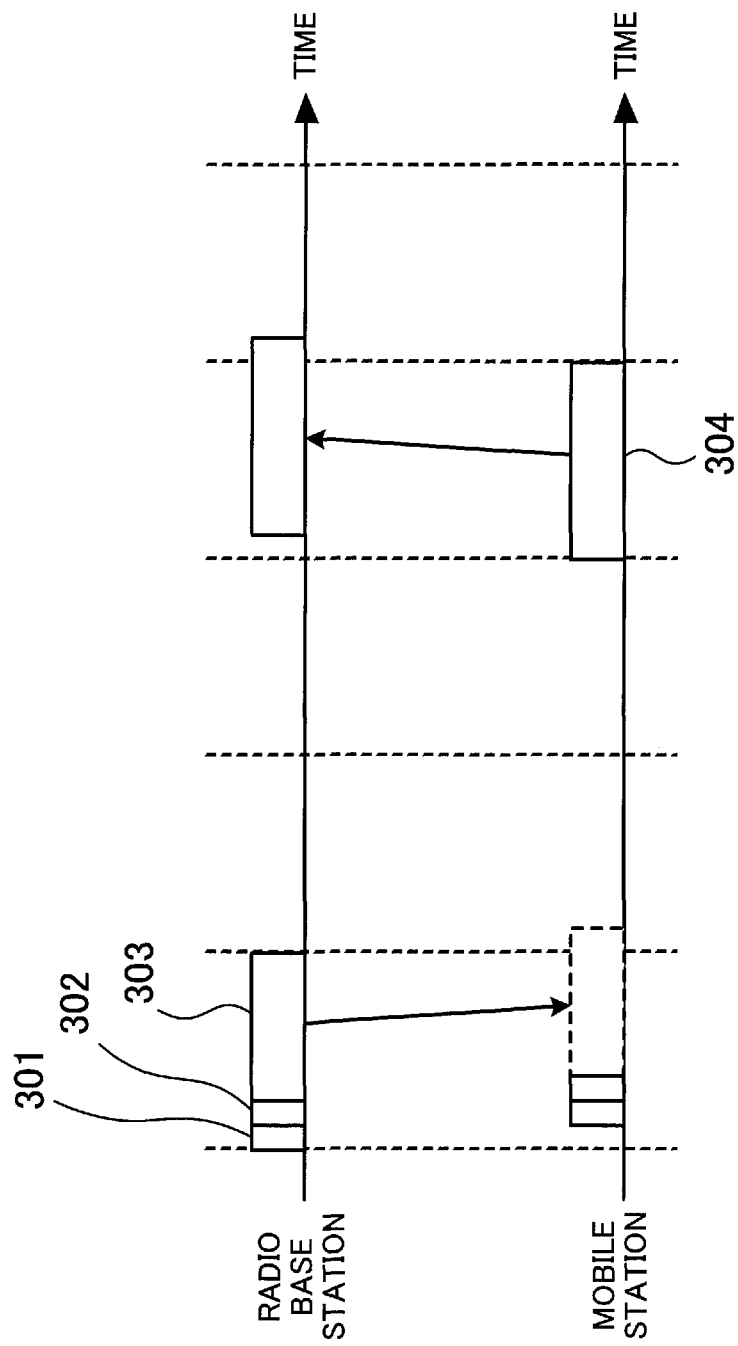
FIG. 31 is a view for describing a format mismatch (part 1)
Figure 32:
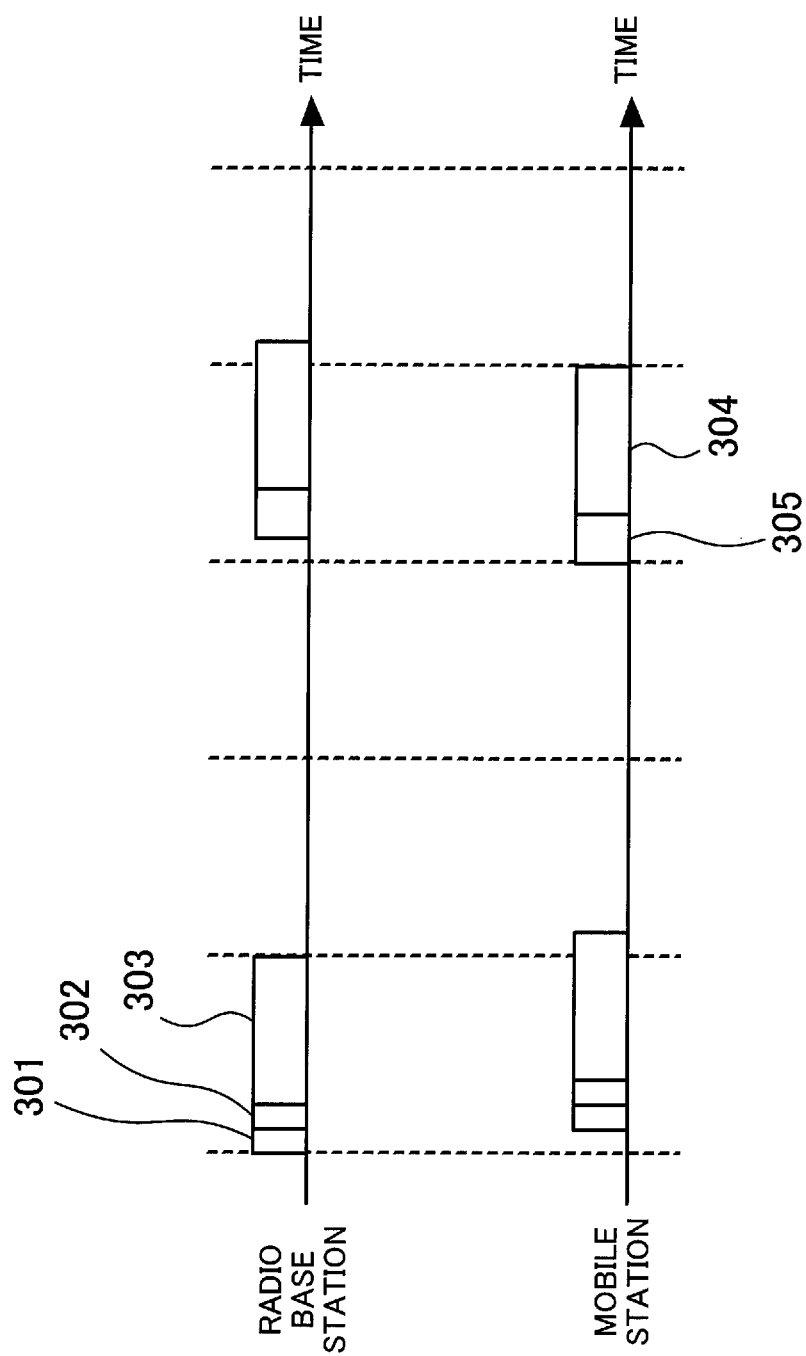
FIG. 32 is a view for describing a format mismatch (part 2).

In FIGS. 31 and 32, the downlink scheduling information 301 and the UL allocation grant 302 are encoded separately. Accordingly, the case where the mobile station fails to detect only one of the downlink scheduling information 301 and the UL allocation grant 302 included in a PDCCH and succeeds in detecting only the other arises. As a result, a mismatch occurs between transmission formats used by the radio base station and the mobile station.

On the other hand, the radio base station 11 illustrated in FIG. 2 encodes the downlink scheduling information and the UL allocation grant in block as illustrated in FIGS. 3 and 4. Therefore, the case where the mobile station 12 fails to detect only one of them and succeeds in detecting only the other does not arise. If the mobile station 12 fails to detect the control information obtained by coding the downlink scheduling information and the UL allocation grant in block, then the mobile station 12 does not send uplink data.

Uplink data with which ACK or NACK is multiplexed and uplink data with which ACK or NACK is not multiplexed differ in format. The mobile station 12 illustrated in FIG. 2 does not send uplink data in different formats. That is to say, the mobile station 12 always sends uplink data with which ACK or NACK is multiplexed or sends no data. As a result, the format of uplink data sent from the mobile station 12 to the radio base station 11 is standardized, and the radio base station 11 can receive uplink data properly from the mobile station 12.

Figure 5:
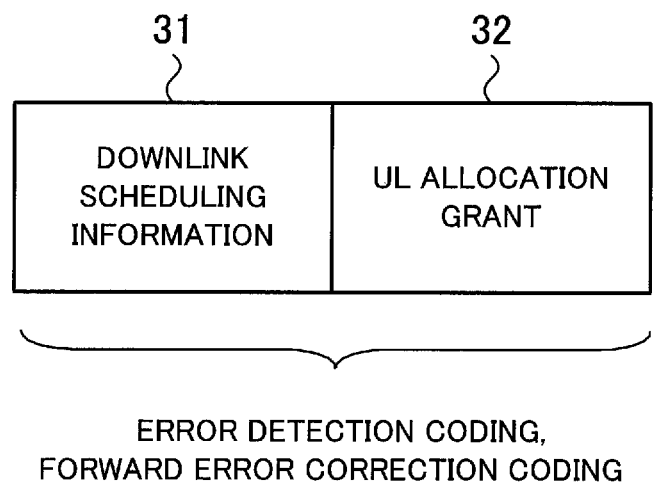
FIG. 5 is a view for describing how to encode downlink scheduling information and UL allocation grant.

FIG. 5 is a view for describing how to encode downlink scheduling information and UL allocation grant. FIG. 5 illustrates downlink scheduling information 31 and UL allocation grant 32.

As illustrated in FIG. 5, the radio base station 11 performs error detection coding on the downlink scheduling information 31 and the UL allocation grant 32 in block (as one piece of data). For example, the radio base station 11 performs CRC (Cyclic Redundancy Check) coding. In addition, the radio base station 11 performs FEC (Forward Error Correction) coding. For example, the radio base station 11 performs turbo coding or convolutional coding.

As stated above, the radio base station 11 performs error detection coding on the downlink scheduling information 31 and the UL allocation grant 32 in block. As a result, the case where the mobile station 12 detects an error only in one of them does not arise. That is to say, if there is an error in one of the downlink scheduling information 31 and the UL allocation grant 32, then the mobile station 12 detects an error both in the downlink scheduling information 31 and in the UL allocation grant 32.

Figure 6:
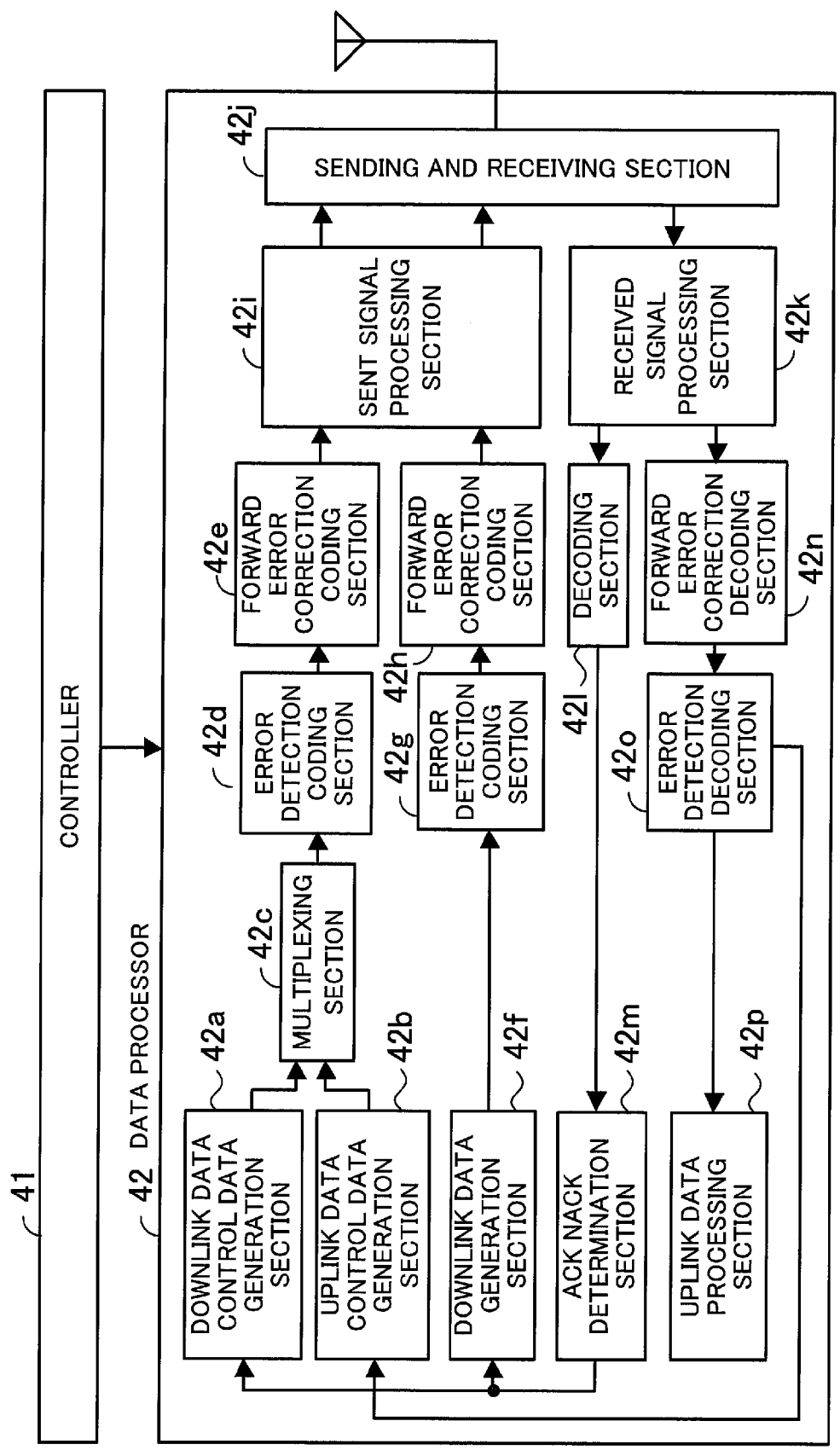
FIG. 6 is a functional block diagram of the radio base station.

FIG. 6 is a functional block diagram of the radio base station. As illustrated in FIG. 6, the radio base station 11 includes a controller 41 and a data processor 42. The controller 41 controls data processing performed by the data processor 42.

A downlink data control data generation section 42a of the data processor 42 generates downlink scheduling information.

An uplink data control data generation section 42b of the data processor 42 generates UL allocation grant.

A multiplexing section 42c of the data processor 42 time-multiplexes the downlink scheduling information generated by the downlink data control data generation section 42a and the UL allocation grant generated by the uplink data control data generation section 42b.

An error detection coding section 42d of the data processor 42 performs error detection coding on the multiplexed downlink scheduling information and UL allocation grant in block. For example, the error detection coding section 42d performs CRC coding.

A forward error correction coding section 42e of the data processor 42 performs forward error correction coding on the downlink scheduling information and the UL allocation grant in block on which error detection coding has been performed. For example, forward error correction coding section 42e performs turbo coding or convolutional coding.

A downlink data generation section 42f of the data processor 42 generates downlink data to be sent to the mobile station 12.

An error detection coding section 42g of the data processor 42 performs error detection coding on the downlink data. For example, the error detection coding section 42g performs CRC coding.

A forward error correction coding section 42h of the data processor 42 performs forward error correction coding on the downlink data. For example, the forward error correction coding section 42h performs turbo coding or convolutional coding.

A sent signal processing section 42i of the data processor 42 processes a signal to be sent to the mobile station 12. For example, the sent signal processing section 42i modulates the encoded downlink scheduling information and UL allocation grant and performs resource mapping. In addition, the sent signal processing section 42i modulates the encoded downlink data, performs resource mapping, and the like.

A sending and receiving section 42j of the data processor 42 radio-transmits a signal outputted from the sent signal processing section 42i to the mobile station 12 via an antenna. In addition, the sending and receiving section 42j receives a signal radio-transmitted from the mobile station 12 and outputs it to a received signal processing section 42k.

The received signal processing section 42k demodulates the radio signal received by the sending and receiving section 42j, performs resource demapping, and the like.

A decoding section 42l of the data processor 42 decodes a signal outputted from the received signal processing section 42k and decodes an ACK or NACK signal.

An ACK NACK determination section 42m of the data processor 42 determines whether a signal decoded by the decoding section 42l is ACK or NACK. If the ACK NACK determination section 42m determines that a signal decoded by the decoding section 42l is NACK, then the ACK NACK determination section 42m controls the downlink data control data generation section 42a and the downlink data generation section 42f so as to resend the downlink data.

A forward error correction decoding section 42n of the data processor 42 performs forward error correction decoding on the uplink data outputted from the received signal processing section 42k.

An error detection decoding section 42o of the data processor 42 performs error detection decoding on the uplink data outputted from the forward error correction decoding section 42n. If the error detection decoding section 42o detects an error in the uplink data, then the error detection decoding section 42o controls the uplink data control data generation section 42b so that the mobile station 12 will send the uplink data again.

An uplink data processing section 42p of the data processor 42 performs a predetermined process on the uplink data outputted from the error detection decoding section 42o.

Figure 7:
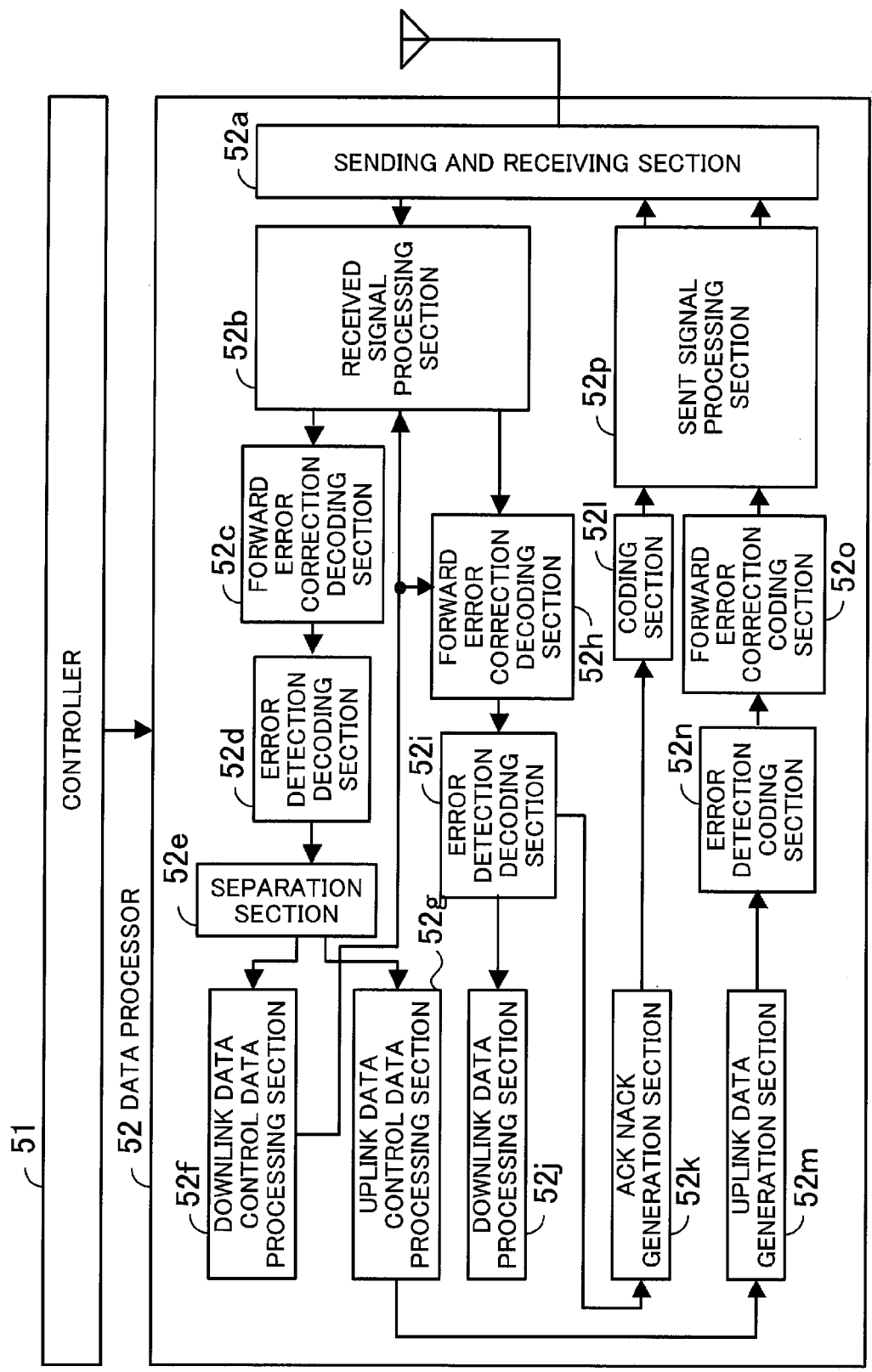
FIG. 7 is a functional block diagram of the mobile station.

FIG. 7 is a functional block diagram of the mobile station. As illustrated in FIG. 7, the mobile station 12 includes a controller 51 and a data processor 52. The controller 51 controls data processing performed by the data processor 52.

A sending and receiving section 52a of the data processor 52 receives the radio signal from the radio base station 11 via an antenna.

A received signal processing section 52b of the data processor 52 demodulates the radio signal received by the sending and receiving section 52a, performs resource demapping, and the like.

A forward error correction decoding section 52c of the data processor 52 performs forward error correction decoding on a signal which is outputted from the received signal processing section 52b and which includes the multiplexed downlink scheduling information and UL allocation grant.

An error detection decoding section 52d of the data processor 52 performs error detection decoding on a signal outputted from the forward error correction decoding section 52c.

A separation section 52e of the data processor 52 separates the multiplexed downlink scheduling information and UL allocation grant outputted from the error detection decoding section 52d. The downlink scheduling information after the separation is outputted to a downlink data control data processing section 52f and the UL allocation grant after the separation is outputted to an uplink data control data processing section 52g.

The downlink data control data processing section 52f controls the received signal processing section 52b on the basis of the downlink scheduling information.

The uplink data control data processing section 52g controls an uplink data generation section 52m on the basis of the UL allocation grant.

A forward error correction decoding section 52h of the data processor 52 performs forward error correction decoding on the downlink data outputted from the received signal processing section 52b.

An error detection decoding section 52i of the data processor 52 performs error detection decoding on the downlink data outputted from the forward error correction decoding section 52h.

A downlink data processing section 52j of the data processor 52 performs a predetermined process on the downlink data outputted from the error detection decoding section 52i.

An ACK NACK generation section 52k of the data processor 52 generates ACK or NACK according to error detection decoding performed on the downlink data by the error detection decoding section 52i. If the error detection decoding section 52i detects an error in the downlink data, then the ACK NACK generation section 52k generates NACK. If the error detection decoding section 52i does not detect an error in the downlink data, then the ACK NACK generation section 52k generates ACK.

A coding section 52l of the data processor 52 encodes the ACK or NACK outputted from the ACK NACK generation section 52k.

An uplink data generation section 52m of the data processor 52 generates the uplink data to be sent to the radio base station 11 under the control of the uplink data control data processing section 52g. For example, if a radio resource to be used by the mobile station 12 is assigned by the UL allocation grant, then the uplink data generation section 52m generates uplink data to be sent to the radio base station 11.

An error detection coding section 52n of the data processor 52 performs error detection coding on the uplink data generated by the uplink data generation section 52m.

A forward error correction coding section 52o of the data processor 52 performs forward error correction coding on the uplink data outputted from the error detection coding section 52n.

A sent signal processing section 52p of the data processor 52 modulates an ACK or NACK signal outputted from the coding section 52l and the uplink data outputted from the forward error correction coding section 52o, performs resource mapping, and the like.

As stated above, the radio base station 11 encodes downlink scheduling information and UL allocation grant in block. As a result, uplink data the format of which is standardized is sent from the mobile station 12 and the radio base station 11 can receive the uplink data properly.

A second embodiment of the present invention will now be described in detail with reference to the accompanying drawings. In the first embodiment, the radio base station performs error detection coding on the downlink scheduling information and the UL allocation grant in block and then performs forward error correction coding on them. In the second embodiment, a radio base station performs error detection coding separately on downlink scheduling information and UL allocation grant and then performs forward error correction coding on them in block.

Figure 8:
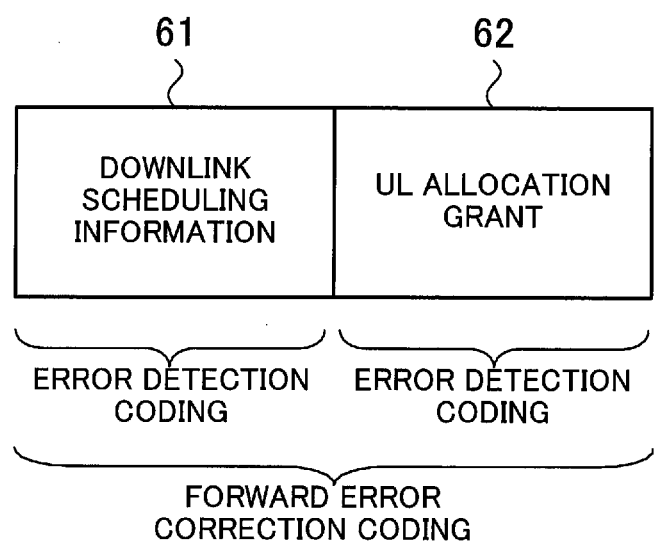
FIG. 8 is a view for describing how to encode downlink scheduling information and UL allocation grant in a radio system according to a second embodiment.

FIG. 8 is a view for describing how to encode downlink scheduling information and UL allocation grant in a radio system according to the second embodiment. FIG. 8 illustrates downlink scheduling information 61 and UL allocation grant 62.

As illustrated in FIG. 8, the radio base station performs error detection coding separately on the downlink scheduling information 61 and the UL allocation grant 62. For example, the radio base station performs CRC coding.

In addition, the radio base station performs forward error correction coding on the downlink scheduling information 61 and the UL allocation grant 62 in block on which error detection coding has been performed. For example, the radio base station performs turbo coding or convolutional coding.

As stated above, the radio base station performs error detection coding separately on the downlink scheduling information 61 and the UL allocation grant 62 and performs forward error correction coding on them in block. This reduces the possibility that a mobile station will detect an error only in one of them. That is to say, if the mobile station does not perform forward error correction decoding properly on the downlink scheduling information 61 and the UL allocation grant 62, then the mobile station detects an error both in the downlink scheduling information 61 and in the UL allocation grant 62.

As a result, the possibility that the mobile station fails to detect the downlink scheduling information 61, that the mobile station succeeds in detecting the UL allocation grant 62, and that the mobile station sends only uplink data to the radio base station gets smaller. Accordingly, the possibility of a format mismatch in uplink data received by the radio base station can be reduced.

Figure 9:
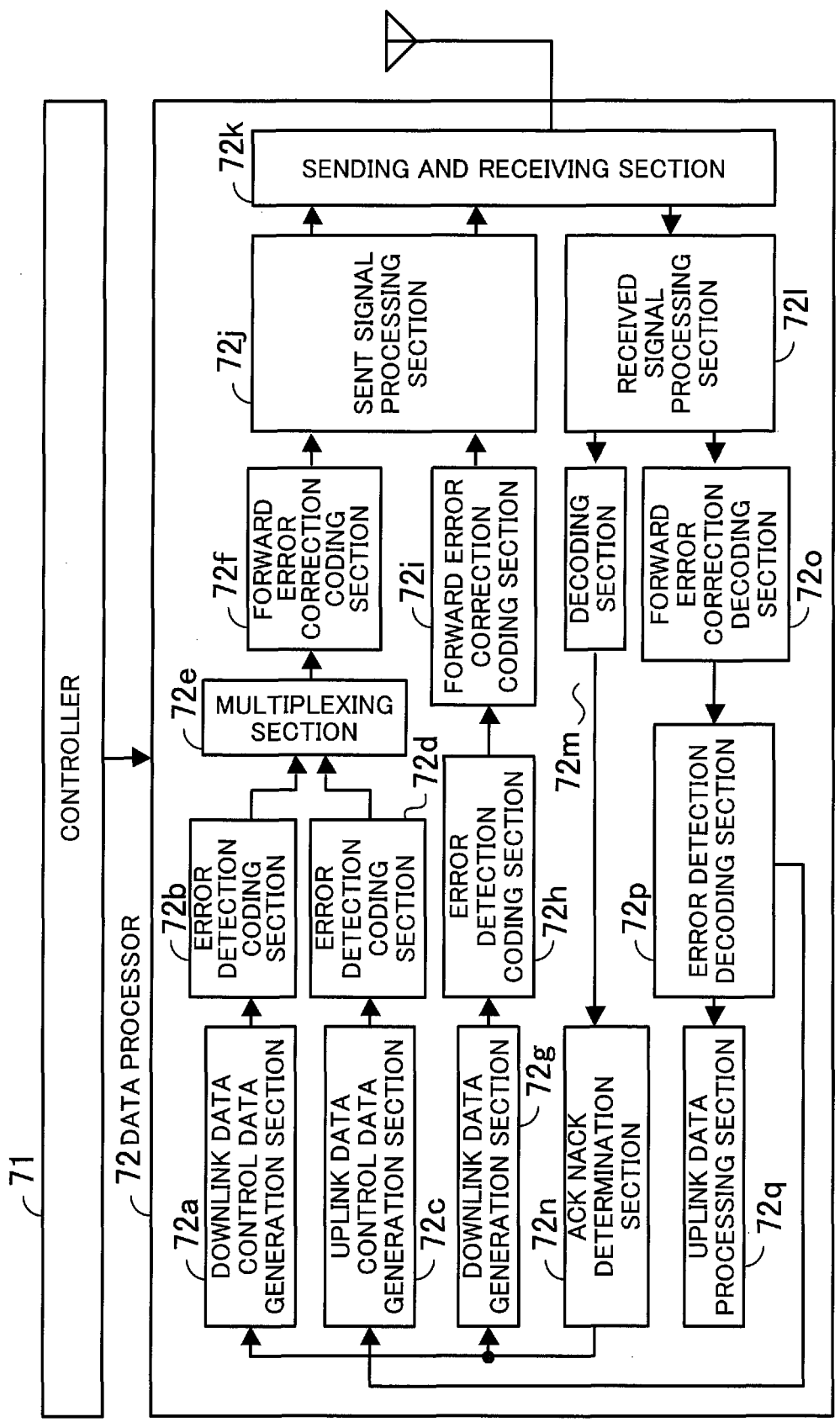
FIG. 9 is a functional block diagram of a radio base station.

FIG. 9 is a functional block diagram of the radio base station. Components in FIG. 9 have the same functions as those of the radio base station 11 illustrated in FIG. 6 have. However, the radio base station illustrated in FIG. 9 differs from the radio base station 11 illustrated in FIG. 6 in coding procedure. Only respects in which the radio base station illustrated in FIG. 9 differs from the radio base station 11 illustrated in FIG. 6 will now be described.

With the radio base station illustrated in FIG. 9, unlike the radio base station 11 illustrated in FIG. 6, error detection coding sections 72b and 72d perform error detection coding on downlink scheduling information outputted from a downlink data control data generation section 72a and UL allocation grant outputted from an uplink data control data generation section 72c, respectively, and a multiplexing section 72e multiplexes them. A forward error correction coding section 72f then performs forward error correction coding on the multiplexed downlink scheduling information and UL allocation grant in block.

Figure 10:
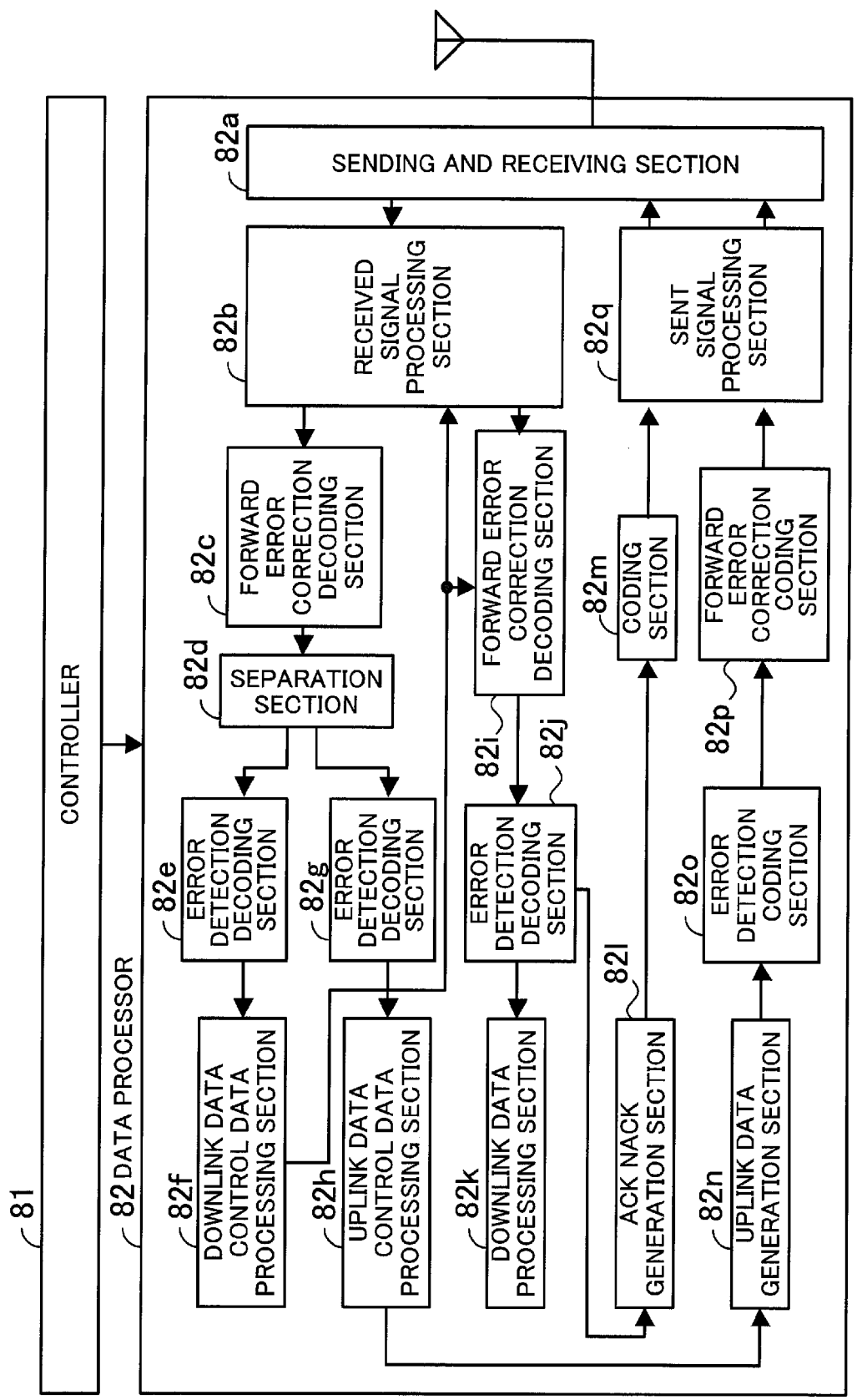
FIG. 10 is a functional block diagram of a mobile station.

FIG. 10 is a functional block diagram of the mobile station. Components in FIG. 10 have the same functions as those of the mobile station 12 illustrated in FIG. 7 have. However, the mobile station illustrated in FIG. 10 differs from the mobile station 12 illustrated in FIG. 7 in decoding procedure. Only respects in which the mobile station illustrated in FIG. 10 differs from the mobile station 12 illustrated in FIG. 7 will now be described.

With a signal received by the mobile station illustrated in FIG. 10, error detection coding has been performed separately on the downlink scheduling information and the UL allocation grant and forward error correction coding has been performed on them in block. Therefore, with the mobile station illustrated in FIG. 10, unlike the mobile station 12 illustrated in FIG. 7, a forward error correction decoding section 82c performs forward error correction decoding on the received downlink scheduling information and UL allocation grant.

A separation section 82d of the mobile station illustrated in FIG. 10 then separates the downlink scheduling information and UL allocation grant on which the forward error correction decoding has been performed into the downlink scheduling information and the UL allocation grant. Error detection decoding sections 82e and 82g then perform error detection decoding on the downlink scheduling information and the UL allocation grant, respectively, which are separated from each other.

As stated above, the radio base station performs error detection coding separately on downlink scheduling information and UL allocation grant and then performs forward error correction coding on them in block. As a result, uplink data the format of which is standardized can be sent from the mobile station, so the radio base station can receive the uplink data properly.

A third embodiment of the present invention will now be described in detail with reference to the accompanying drawings. In the third embodiment, unlike the second embodiment, error detection coding is performed separately on downlink scheduling information and UL allocation grant, interleaving is performed, and then forward error correction coding is performed on them in block.

Figure 11:
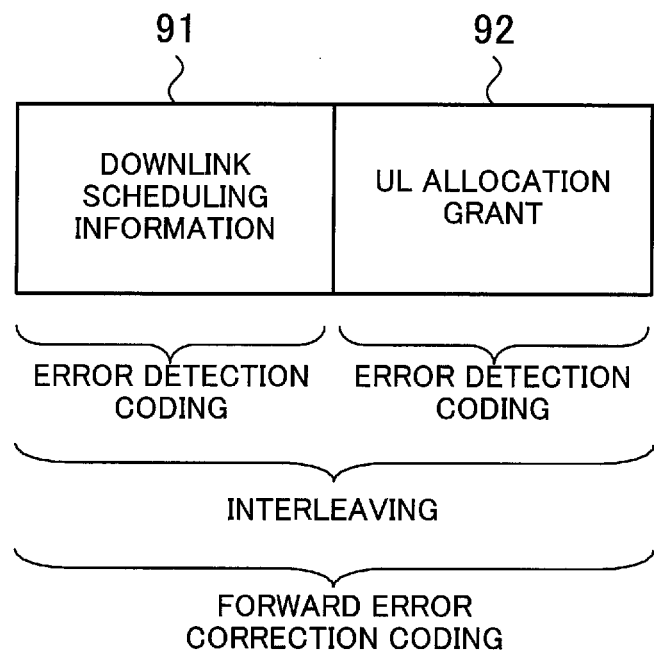
FIG. 11 is a view for describing how to encode downlink scheduling information and UL allocation grant in a radio system according to a third embodiment.

FIG. 11 is a view for describing how to encode downlink scheduling information and UL allocation grant in a radio system according to the third embodiment. FIG. 11 illustrates downlink scheduling information 91 and UL allocation grant 92.

As illustrated in FIG. 11, a radio base station performs error detection coding separately on the downlink scheduling information 91 and the UL allocation grant 92. For example, the radio base station performs CRC coding. In addition, the radio base station performs interleaving on the downlink scheduling information 91 and the UL allocation grant 92 in block on which error detection coding has been performed. The radio base station then performs forward error correction coding on the downlink scheduling information 91 and the UL allocation grant 92 in block on which interleaving has been performed. For example, the radio base station performs turbo coding or convolutional coding.

As stated above, error detection coding is performed separately on the downlink scheduling information 91 and the UL allocation grant 92, interleaving is performed on them in block, and forward error correction coding is performed on them in block. This also reduces the possibility that the mobile station will detect an error only in one of them. That is to say, if the mobile station does not perform forward error correction decoding properly on the downlink scheduling information 91 and the UL allocation grant 92, then the mobile station detects an error both in the downlink scheduling information 91 and in the UL allocation grant 92.

As a result, the possibility that the mobile station fails to detect the downlink scheduling information 91, succeeds in detecting the UL allocation grant 92, and sends only uplink data to the radio base station gets smaller. Accordingly, the possibility of a format mismatch in uplink data received by the radio base station can be reduced.

Figure 12:
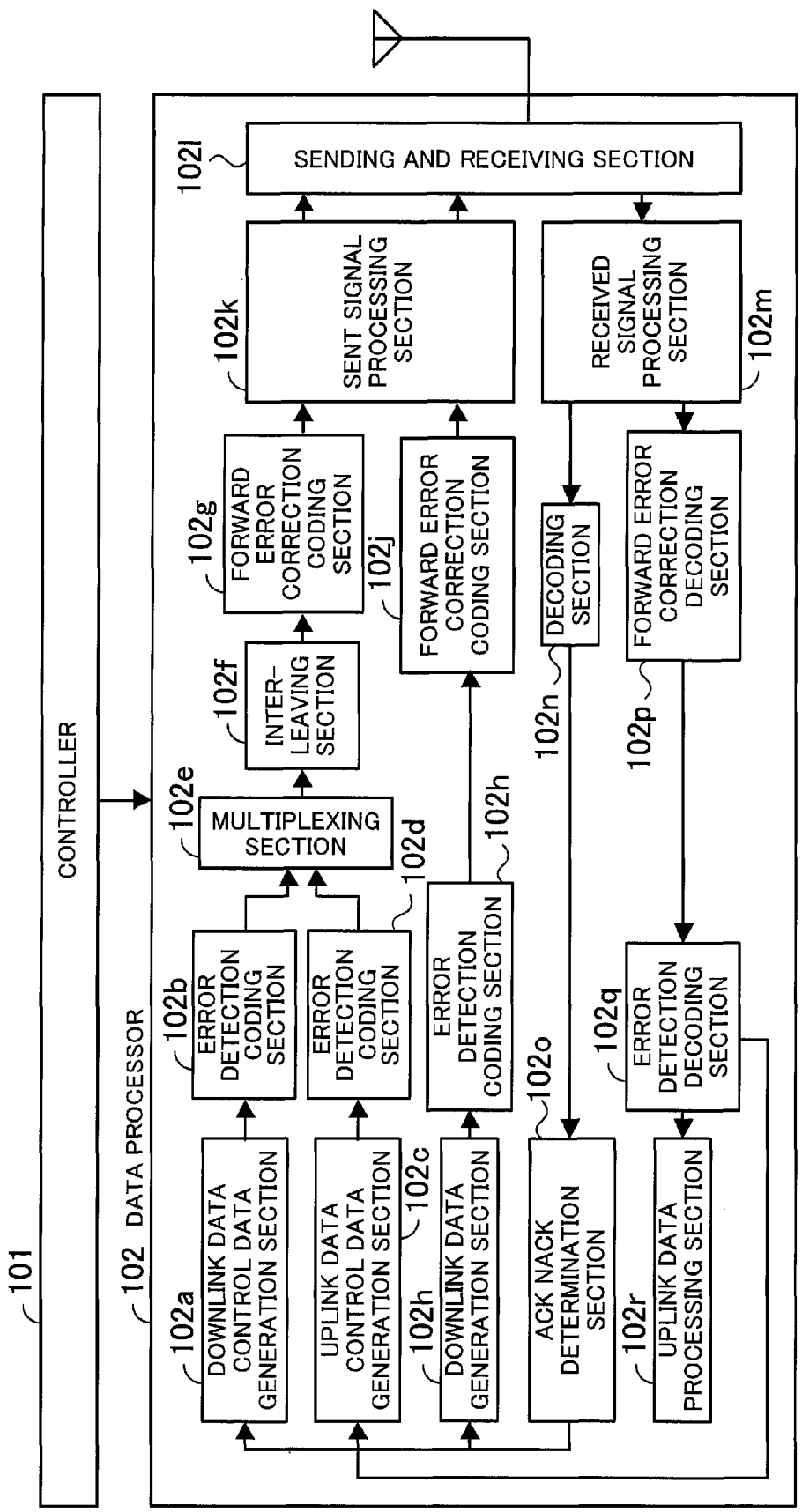
FIG. 12 is a functional block diagram of a radio base station.

FIG. 12 is a functional block diagram of the radio base station. Components in FIG. 12 have the same functions as those of the radio base station illustrated in FIG. 9 have. However, the radio base station illustrated in FIG. 12 differs from the radio base station illustrated in FIG. 9 in that it performs interleaving. Only respects in which the radio base station illustrated in FIG. 12 differs from the radio base station illustrated in FIG. 9 will now be described.

With the radio base station illustrated in FIG. 12, unlike the radio base station illustrated in FIG. 9, a multiplexing section 102e multiplexes downlink scheduling information and UL allocation grant on which error detection coding has been performed, and an interleaving section 102f then interleaves the multiplexed data. A forward error correction coding section 102g then performs forward error correction coding on the interleaved data.

Figure 13:
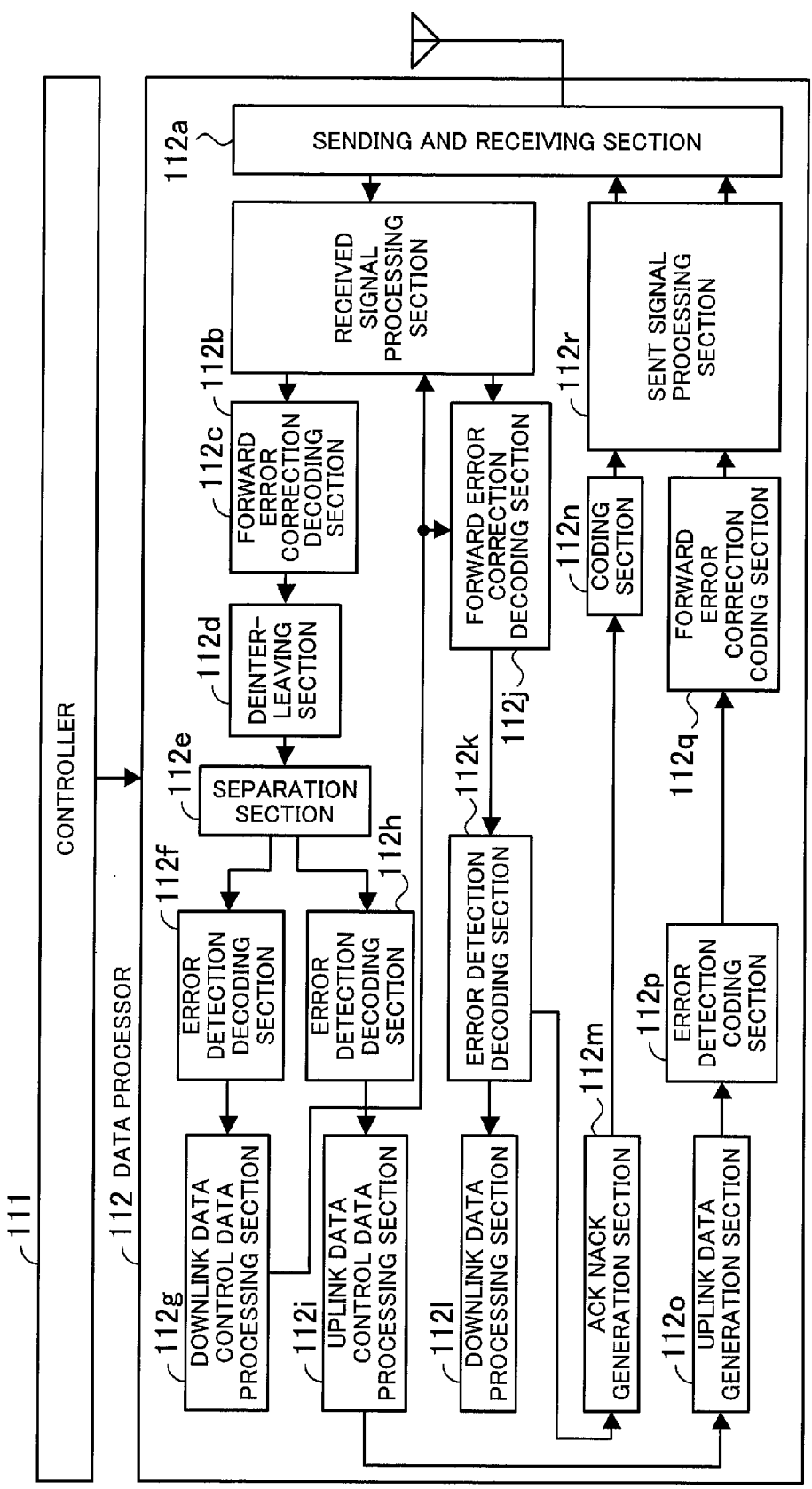
FIG. 13 is a functional block diagram of a mobile station.

FIG. 13 is a functional block diagram of the mobile station. Components in FIG. 13 have the same functions as those of the mobile station illustrated in FIG. 10 have. However, the mobile station illustrated in FIG. 13 differs from the mobile station illustrated in FIG. 10 in that it performs deinterleaving. Only respects in which the mobile station illustrated in FIG. 13 differs from the mobile station illustrated in FIG. 10 will now be described.

With a signal received by the mobile station illustrated in FIG. 13, error detection coding has been performed separately on the downlink scheduling information and the UL allocation grant and interleaving and forward error correction coding have been performed on them. Therefore, with the mobile station illustrated in FIG. 13, unlike the mobile station illustrated in FIG. 10, the downlink scheduling information and the UL allocation grant on which forward error correction decoding has been performed by a forward error correction decoding section 112c are deinterleaved by a deinterleaving section 112d.

In addition, a separation section 112e of the mobile station illustrated in FIG. 13 separates the deinterleaved downlink scheduling information and UL allocation grant into the downlink scheduling information and the UL allocation grant. Error detection decoding sections 112f and 112h perform error detection decoding on the downlink scheduling information and the UL allocation grant, respectively, after the separation.

As stated above, the radio base station performs error detection coding separately on the downlink scheduling information and the UL allocation grant and interleaves them. The radio base station then performs forward error correction coding on the interleaved downlink scheduling information and UL allocation grant in block. By doing so, uplink data the format of which is standardized can also be sent from the mobile station, so the radio base station can receive the uplink data properly.

A fourth embodiment of the present invention will now be described in detail with reference to the accompanying drawings. In the fourth embodiment, a mobile station secures an area for ACK or NACK in a PUSCH regardless of whether there is downlink data the destination of which is the mobile station. If the mobile station receives downlink data the destination of which is the mobile station, then the mobile station stores ACK or NACK in the area. If the mobile station does not receive downlink data the destination of which is the mobile station (if the mobile station does not detect downlink scheduling information the destination of which is the mobile station), then the mobile station sends NACK by the use of the area.

Figure 14:
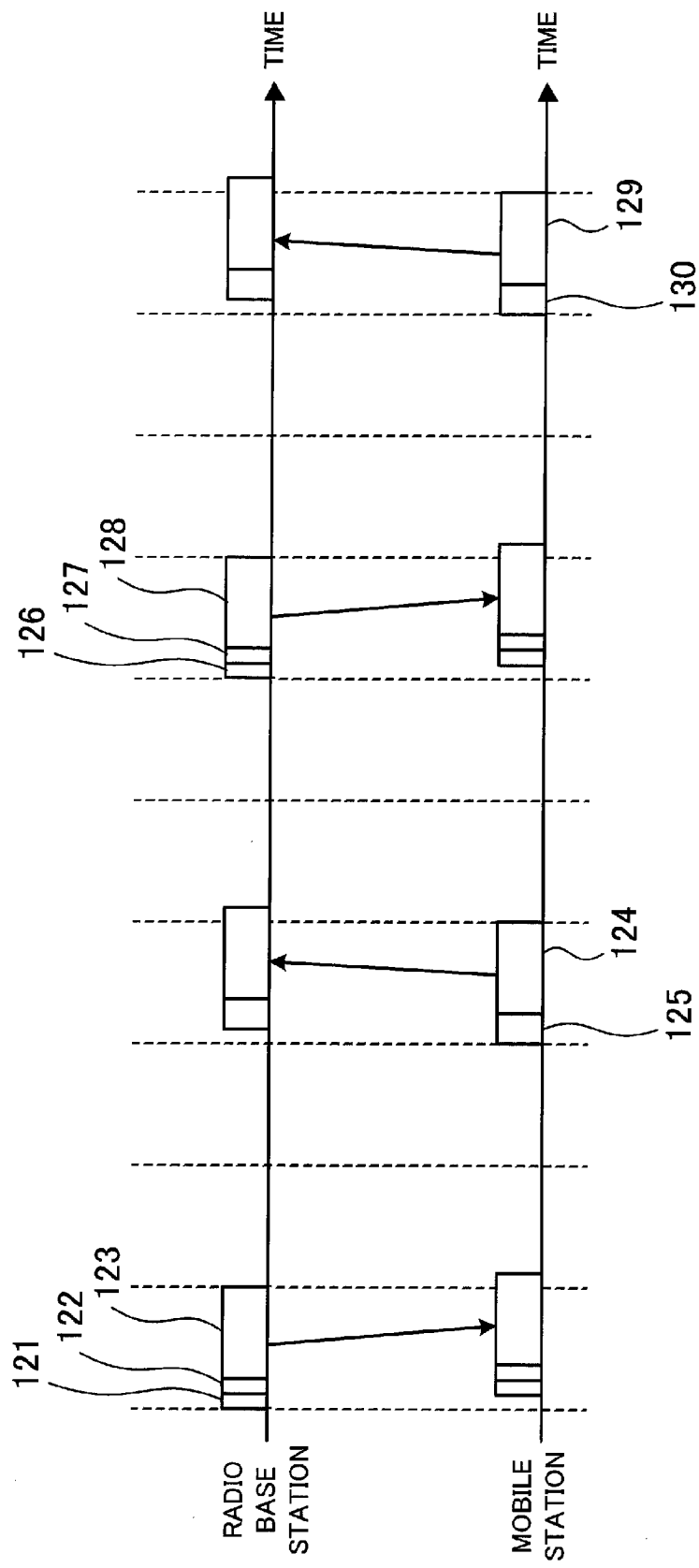
FIG. 14 illustrates the operation of a radio base station and a mobile station according to a fourth embodiment.

FIG. 14 illustrates the operation of a radio base station and the mobile station according to the fourth embodiment. In FIG. 14, downlink scheduling information 121 and 126, UL allocation grant 122 and 127, and downlink data 123 and 128 are indicated. In addition, uplink data 124 and 129 and areas 125 and 130 secured in a PUSCH for ACK or NACK are indicated. Error detection coding is performed separately on the downlink scheduling information 121 and 126 and the UL allocation grant 122 and 127 and forward error correction coding is performed separately on them. The downlink scheduling information 121 and 126 and the UL allocation grant 122 and 127 are then sent to the mobile station.

It is assumed that the mobile station succeeds in detecting the downlink scheduling information 121. Then the mobile station receives the downlink data 123 on the basis of the downlink scheduling information 121.

In addition, it is assumed that the mobile station succeeds in detecting the UL allocation grant 122. Then the mobile station sends the uplink data 124 to the radio base station on the basis of the UL allocation grant 122. At this time the mobile station secures the area 125 in the PUSCH for storing ACK or NACK, stores the ACK or NACK in the area 125, and sends it to the radio base station.

For example, if the mobile station does not detect an error in the downlink data 123 received, then the mobile station stores ACK in the area 125 and sends it to the radio base station. If the mobile station detects an error in the downlink data 123 received, then the mobile station stores NACK in the area 125 and sends it to the radio base station. The radio base station receives the ACK or NACK stored in the area 125 and determines according to the ACK or NACK whether to resend the downlink data 123.

It is assumed that the mobile station fails to detect the downlink scheduling information 126. In this case, the mobile station does not perform the process of receiving the downlink data 128.

In addition, it is assumed that the mobile station succeeds in detecting the UL allocation grant 127. Then the mobile station sends the uplink data 129 to the radio base station on the basis of the UL allocation grant 127.

At this time the mobile station secures the area 130 in the PUSCH for storing ACK or NACK, stores NACK in the area 130, and sends it to the radio base station. The reason for this is that the mobile station does not receive downlink data.

As stated above, an area is secured in a PUSCH for storing ACK or NACK. If the mobile station succeeds in detecting downlink scheduling information and receives downlink data, then the mobile station stores ACK or NACK which is a result of error detection on the downlink data in the area and sends the ACK or NACK. If the mobile station fails to detect the downlink scheduling information and does not receive the downlink data, then the mobile station stores NACK in the area and sends the NACK.

As a result, the mobile station always sends data to the radio base station in the same transmission format including areas for uplink data and ACK or NACK, so the radio base station can receive the uplink data properly.

Figure 15:
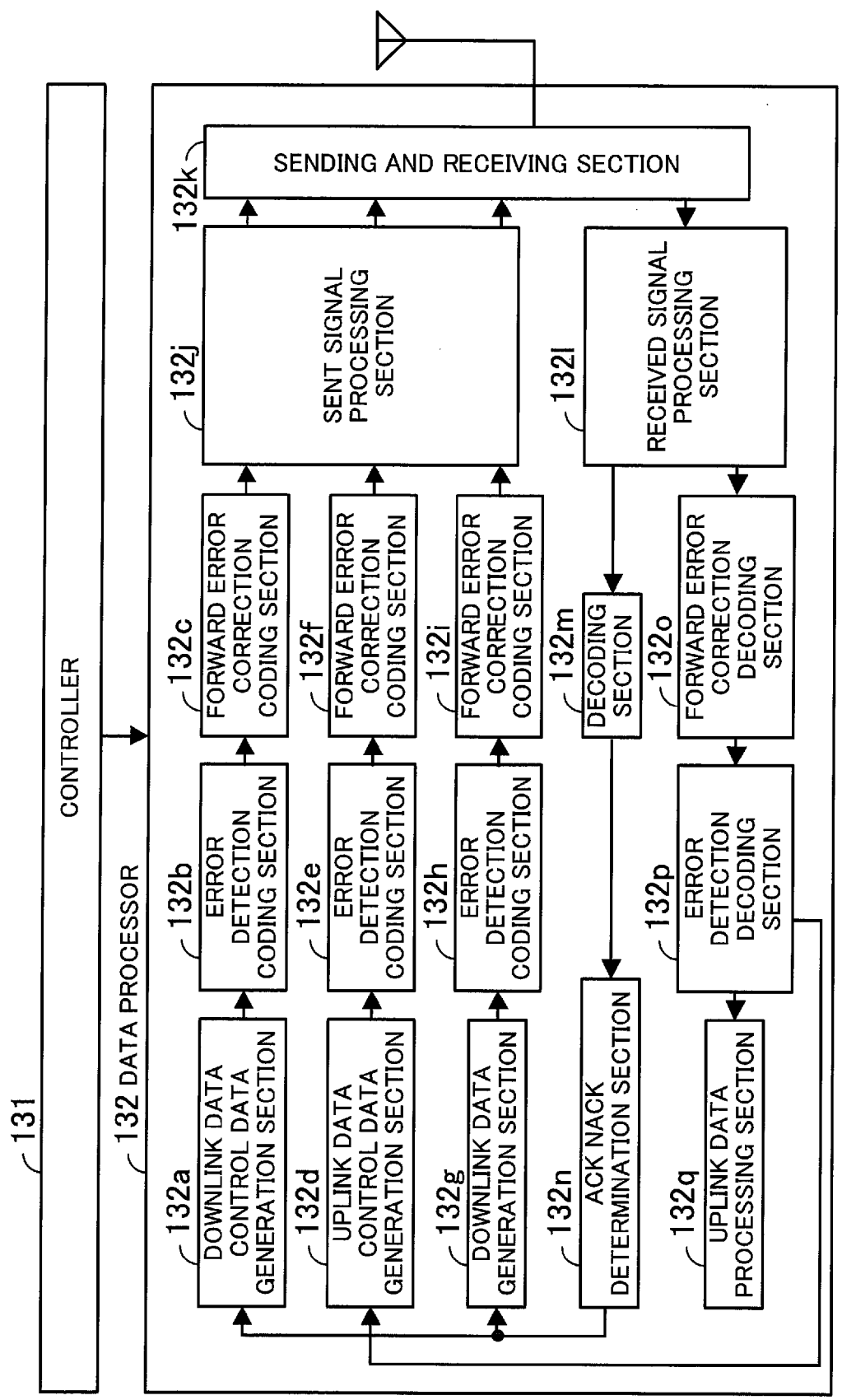
FIG. 15 is a functional block diagram of the radio base station.

FIG. 15 is a functional block diagram of the radio base station. Components in FIG. 15 have the same functions as those of the radio base station 11 illustrated in FIG. 6 have. However, the radio base station illustrated in FIG. 15 differs from the radio base station 11 illustrated in FIG. 6 in that it performs error detection coding and forward error correction coding separately on downlink scheduling information and UL allocation grant and that it then sends the downlink scheduling information and the UL allocation grant to the mobile station. In addition, the radio base station illustrated in FIG. 15 differs from the radio base station 11 illustrated in FIG. 6 in that it receives a PUSCH in which an area for storing ACK or NACK is secured. Only respects in which the radio base station illustrated in FIG. 15 differs from the radio base station 11 illustrated in FIG. 6 will now be described.

With the radio base station illustrated in FIG. 15, unlike the radio base station 11 illustrated in FIG. 6, error detection coding sections 132b and 132e and forward error correction coding sections 132c and 132f encode downlink scheduling information outputted from a downlink data control data generation section 132a and UL allocation grant outputted from an uplink data control data generation section 132d, respectively.

In addition, a received signal processing section 1321 of the radio base station illustrated in FIG. 15 recognizes an area for ACK or NACK in the PUSCH, extracts ACK or NACK from the area, and outputs it to a decoding section 132m.

Figure 16:
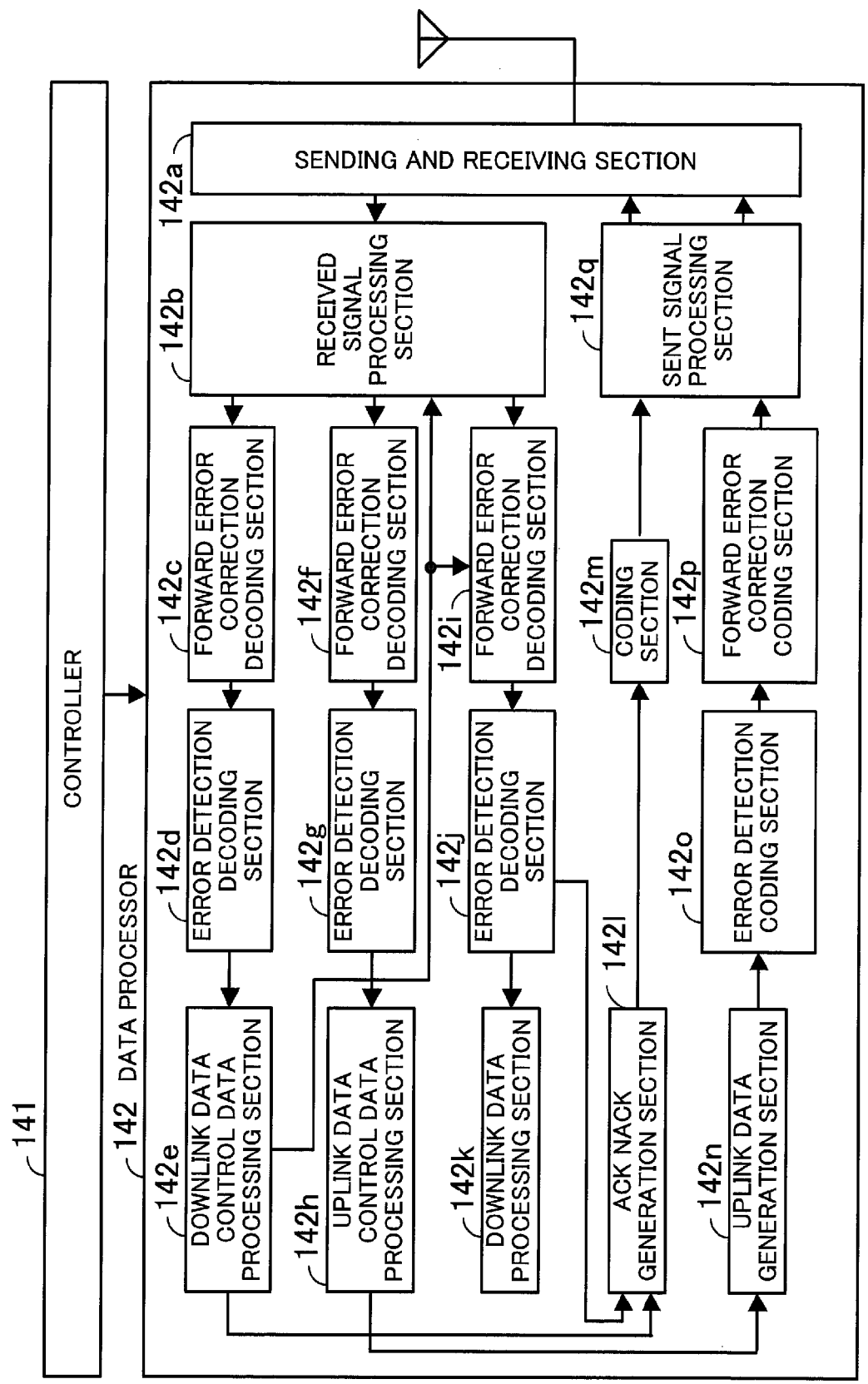
FIG. 16 is a functional block diagram of the mobile station.

FIG. 16 is a functional block diagram of the mobile station. Components in FIG. 16 have the same functions as those of the mobile station 12 illustrated in FIG. 7 have. However, the mobile station illustrated in FIG. 16 differs from the mobile station 12 illustrated in FIG. 7 in that it receives downlink scheduling information and UL allocation grant encoded separately. In addition, the mobile station illustrated in FIG. 16 differs from the mobile station 12 illustrated in FIG. 7 in that it secures an area for storing ACK or NACK in a PUSCH. Only respects in which the mobile station illustrated in FIG. 16 differs from the mobile station 12 illustrated in FIG. 7 will now be described.

With a signal received by the mobile station illustrated in FIG. 16, the downlink scheduling information and the UL allocation grant have been encoded separately. Therefore, with the mobile station illustrated in FIG. 16, unlike the mobile station 12 illustrated in FIG. 7, forward error correction decoding sections 142c and 142f perform forward error correction decoding on the downlink scheduling information and the UL allocation grant, respectively, and error detection decoding sections 142d and 142g perform error detection decoding on the downlink scheduling information and the UL allocation grant respectively.

An ACK NACK generation section 1421 generates ACK or NACK according to a result of error detection on downlink data. In addition, if downlink data is not received, then the ACK NACK generation section 1421 generates NACK.

A sent signal processing section 142q secures an area for storing ACK or NACK in a PUSCH. The sent signal processing section 142q then stores the encoded ACK or NACK in the area secured and sends it with uplink data to the radio base station.

As stated above, the mobile station always secures an area for storing ACK or NACK in a PUSCH and sends the ACK or NACK. As a result, the radio base station always receives a PUSCH in the same transmission format, so the radio base station can receive uplink data properly.

A fifth embodiment of the present invention will now be described in detail with reference to the accompanying drawings. In the fifth embodiment, when a mobile station sends uplink data, it gives information indicative of the presence or absence of ACK or NACK as a physical control channel.

Figure 17:
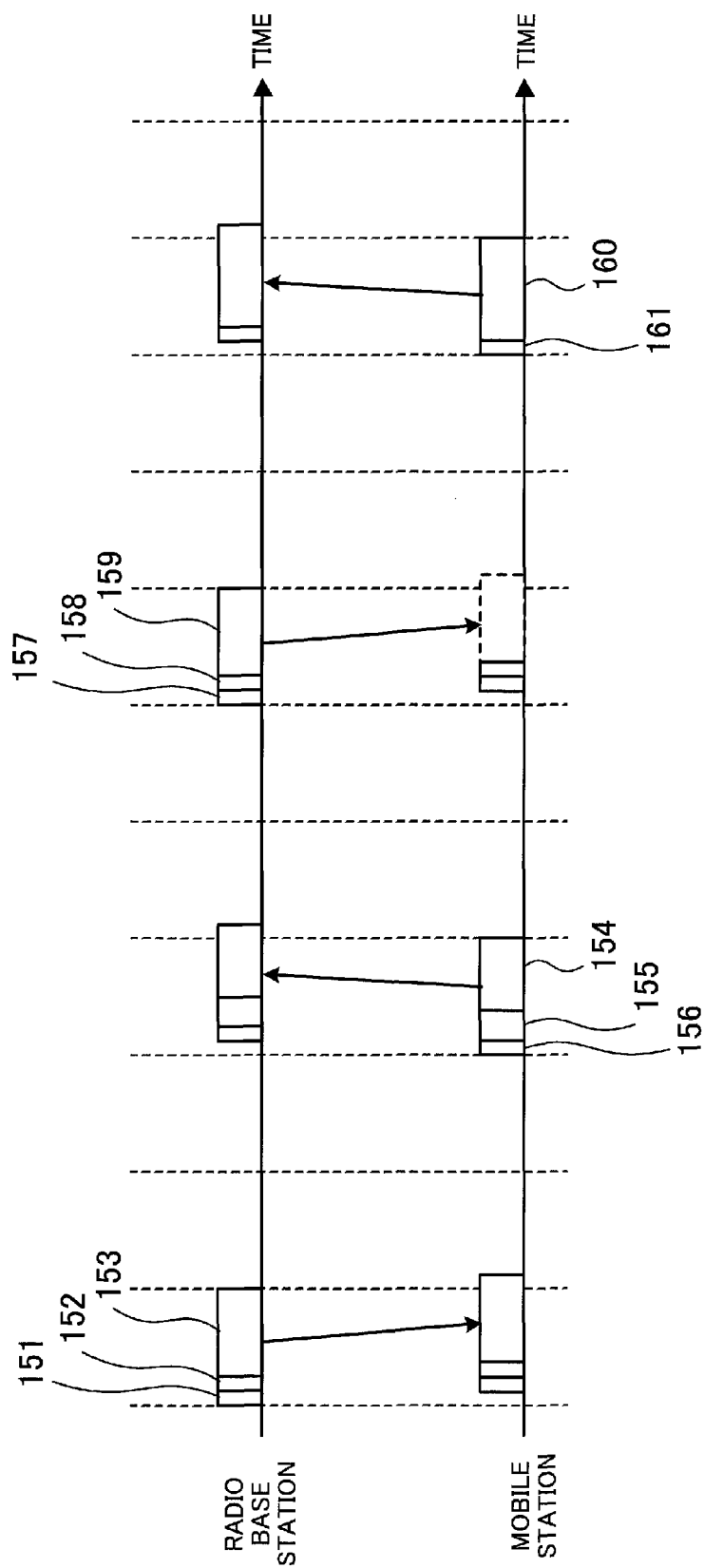
FIG. 17 illustrates the operation of a radio base station and a mobile station according to a fifth embodiment.

FIG. 17 illustrates the operation of a radio base station and a mobile station according to the fifth embodiment. In FIG. 17, downlink scheduling information 151 and 157, UL allocation grant 152 and 158, and downlink data 153 and 159 are indicated. In addition, uplink data 154 and 160, an area 155 secured in a PUSCH for ACK or NACK, and control information 156 and 161 indicative of the presence or absence of the ACK or NACK are indicated. The downlink scheduling information 151 and 157 and the UL allocation grant 152 and 158 are encoded separately and are sent to the mobile station.

It is assumed that the mobile station succeeds in detecting the downlink scheduling information 151. Then the mobile station receives the downlink data 153 on the basis of the downlink scheduling information 151.

In addition, it is assumed that the mobile station succeeds in detecting the UL allocation grant 152. Then the mobile station sends the uplink data 154 to the radio base station on the basis of the UL allocation grant 152.

At this time the mobile station secures the area 155 in the PUSCH for storing ACK or NACK and gives the control information 156 indicative that the area 155 is secured to the PUSCH. The control information 156 is indicated by, for example, bit information. "1" indicates that the area 155 for ACK or NACK is secured, and "0" indicates that the area 155 for ACK or NACK is not secured.

The mobile station succeeds in detecting the downlink scheduling information 151 and receives the downlink data 153. Therefore, the mobile station sends ACK or NACK indicative of a result of error detection on the downlink data 153 to the radio base station by the use of the area 155 and sends the radio base station the control information 156 (bit information "1") indicative that the area 155 is secured.

It is assumed that the mobile station fails to detect the downlink scheduling information 157. In this case, the mobile station does not perform the process of receiving the downlink data 159.

In addition, It is assumed that the mobile station succeeds in detecting the UL allocation grant 158. Then the mobile station sends the uplink data 160 to the radio base station on the basis of the UL allocation grant 158.

At this time the mobile station does not receive the downlink data 159, so the mobile station does not detect an error in the downlink data 159. Accordingly, the mobile station does not secure an area in a PUSCH for storing ACK or NACK, and sends the radio base station the control information 161 (bit information "0") indicative that an area for ACK or NACK is not secured.

As stated above, when the mobile station sends ACK or NACK to the radio base station, the mobile station gives control information indicative whether an area for sending the ACK or NACK is secured and sends it to the radio base station.

As a result, the radio base station can determine whether ACK or NACK information is added to uplink data, and receive the uplink data properly.

Figure 18:
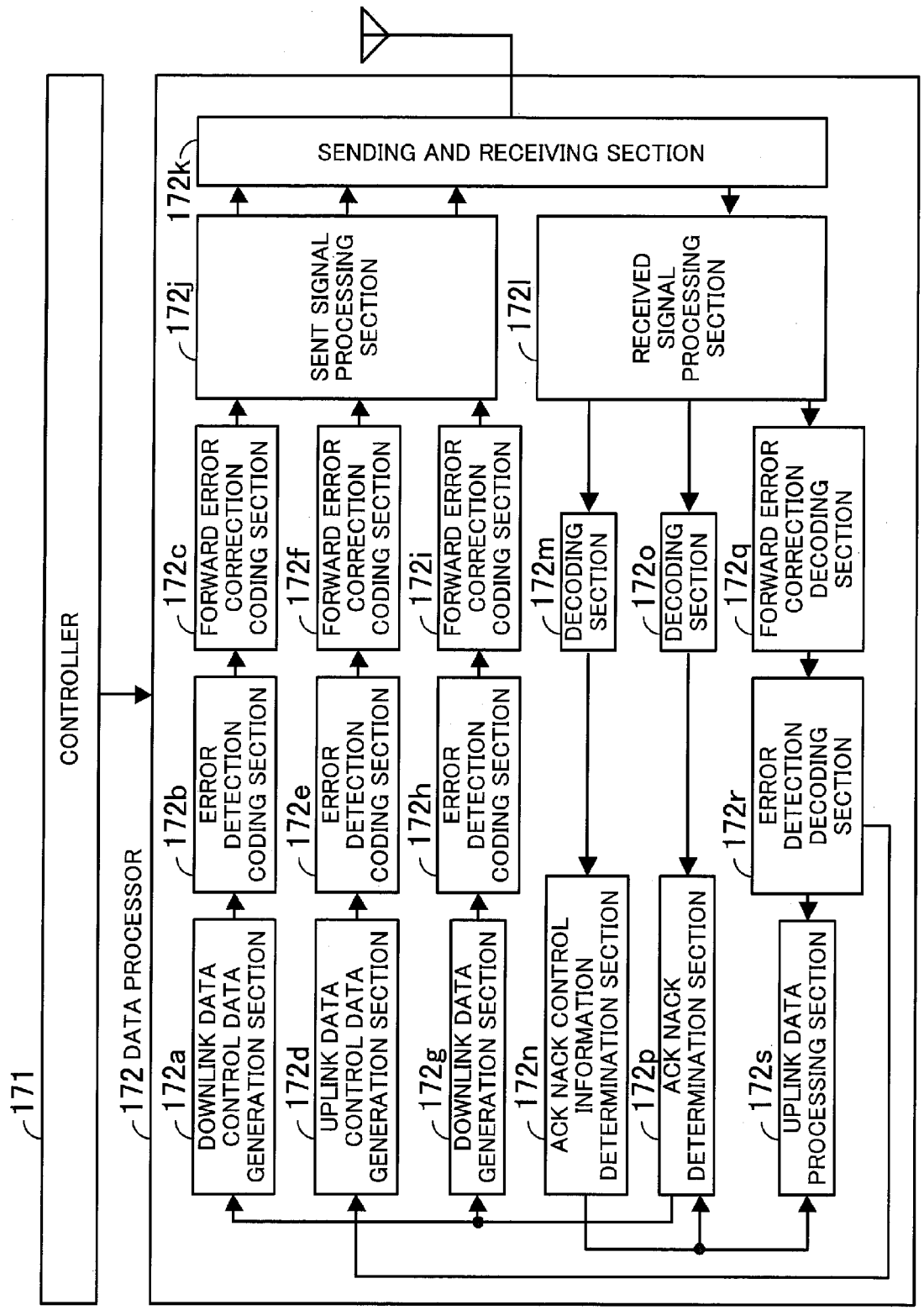
FIG. 18 is a functional block diagram of the radio base station.

FIG. 18 is a functional block diagram of the radio base station. Components in FIG. 18 have the same functions as those of the radio base station illustrated in FIG. 15 have. However, the radio base station illustrated in FIG. 18 differs from the radio base station illustrated in FIG. 15 in that it extracts control information to the effect of an area for storing ACK or NACK being secured which is sent from the mobile station and that it determines the presence or absence of ACK or NACK on the basis of the extracted control information. Only respects in which the radio base station illustrated in FIG. 18 differs from the radio base station illustrated in FIG. 15 will now be described.

With the radio base station illustrated in FIG. 18, unlike the radio base station illustrated in FIG. 15, a received signal processing section 1721 acquires control information included in a PUSCH. A decoding section 172m decodes the control information acquired by the received signal processing section 1721.

An ACK NACK control information determination section 172n determines whether the decoded control information is "1" or "0." That is to say, the ACK NACK control information determination section 172n determines whether ACK or NACK is included in the PUSCH. If ACK or NACK is included in the PUSCH, then the ACK NACK control information determination section 172n gives an ACK NACK determination section 172p and an uplink data processing section 172s notice to that effect. When the ACK NACK determination section 172p and the uplink data processing section 172s recognize that an area for ACK or NACK is secured in the PUSCH, they determine which of ACK and NACK is included in the PUSCH, and process uplink data, respectively.

Figure 19:
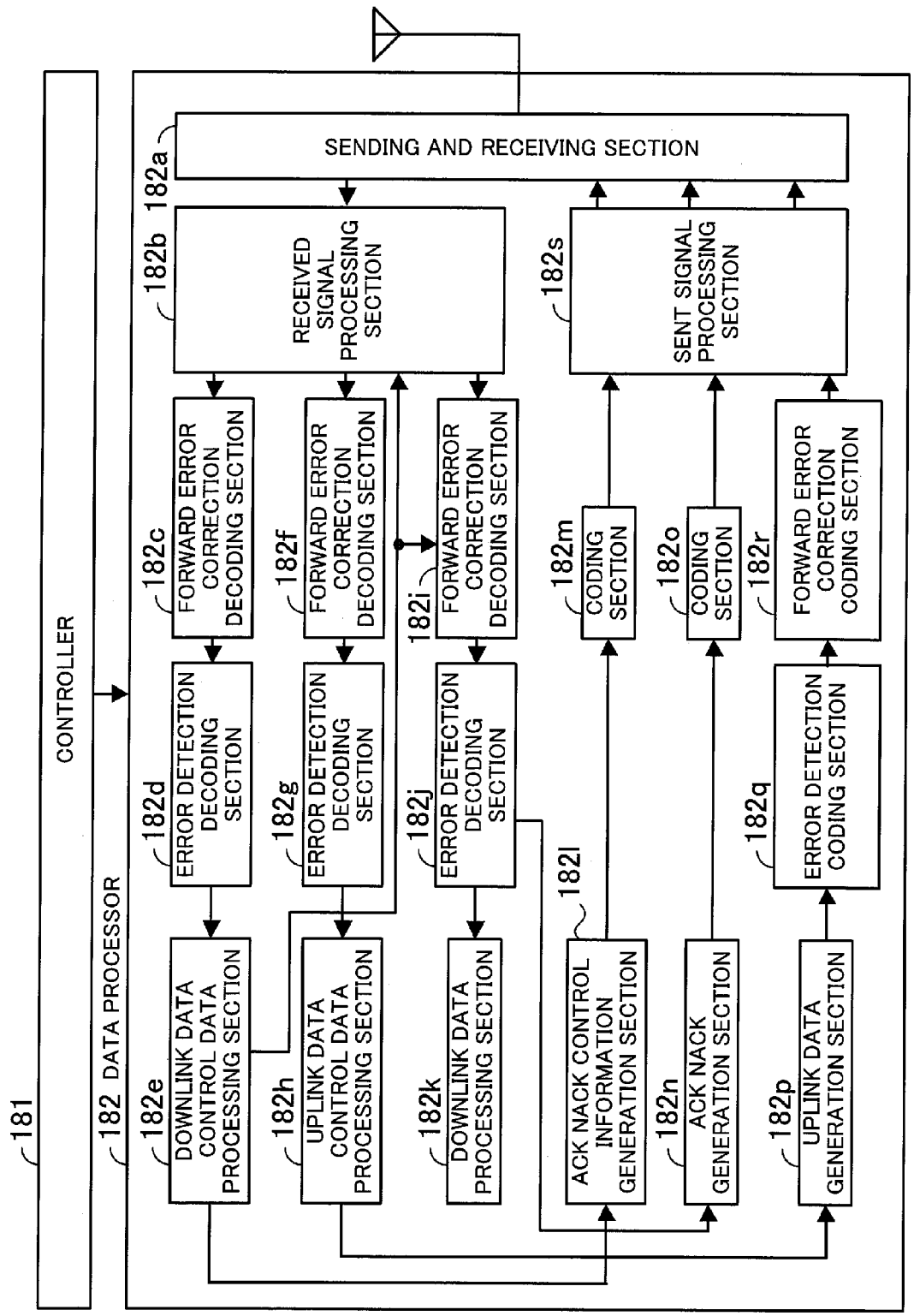
FIG. 19 is a functional block diagram of the mobile station.

FIG. 19 is a functional block diagram of the mobile station. Components in FIG. 19 have the same functions as those of the mobile station illustrated in FIG. 16 have. However, the mobile station illustrated in FIG. 19 differs from the mobile station illustrated in FIG. 16 in that it gives control information indicative of whether an area for ACK or NACK is secured in a PUSCH. Only respects in which the mobile station illustrated in FIG. 19 differs from the mobile station illustrated in FIG. 16 will now be described.

An ACK NACK control information generation section 1821 generates control information indicative of whether an area for ACK or NACK is secured. For example, if the mobile station succeeds in detecting downlink scheduling information, then the mobile station sends ACK or NACK to the radio base station. Therefore, the ACK NACK control information generation section 1821 generates control information (bit information "1") indicative that an area for ACK or NACK is secured. If the mobile station fails to detect the downlink scheduling information, then the mobile station does not send ACK or NACK to the radio base station. Therefore, the ACK NACK control information generation section 1821 generates control information (bit information "0") indicative that an area for ACK or NACK is not secured.

If the ACK or NACK is generated, then a sent signal processing section 182s secures an area for the ACK or NACK in a PUSCH, multiplexes the control information and uplink data, and sends them to the radio base station.

As stated above, the mobile station gives control information indicative of whether an area for ACK or NACK is secured in a PUSCH, and sends it to the radio base station. As a result, the radio base station can determine whether ACK or NACK is included in the PUSCH, so the radio base station can recognize a transmission format used by the mobile station for sending, and receive uplink data properly.

A sixth embodiment of the present invention will now be described in detail with reference to the accompanying drawings. In the sixth embodiment, a radio base station tries receiving a signal sent from a mobile station in a format in which ACK or NACK is multiplexed and a format in which ACK or NACK is not multiplexed.

Figure 20:
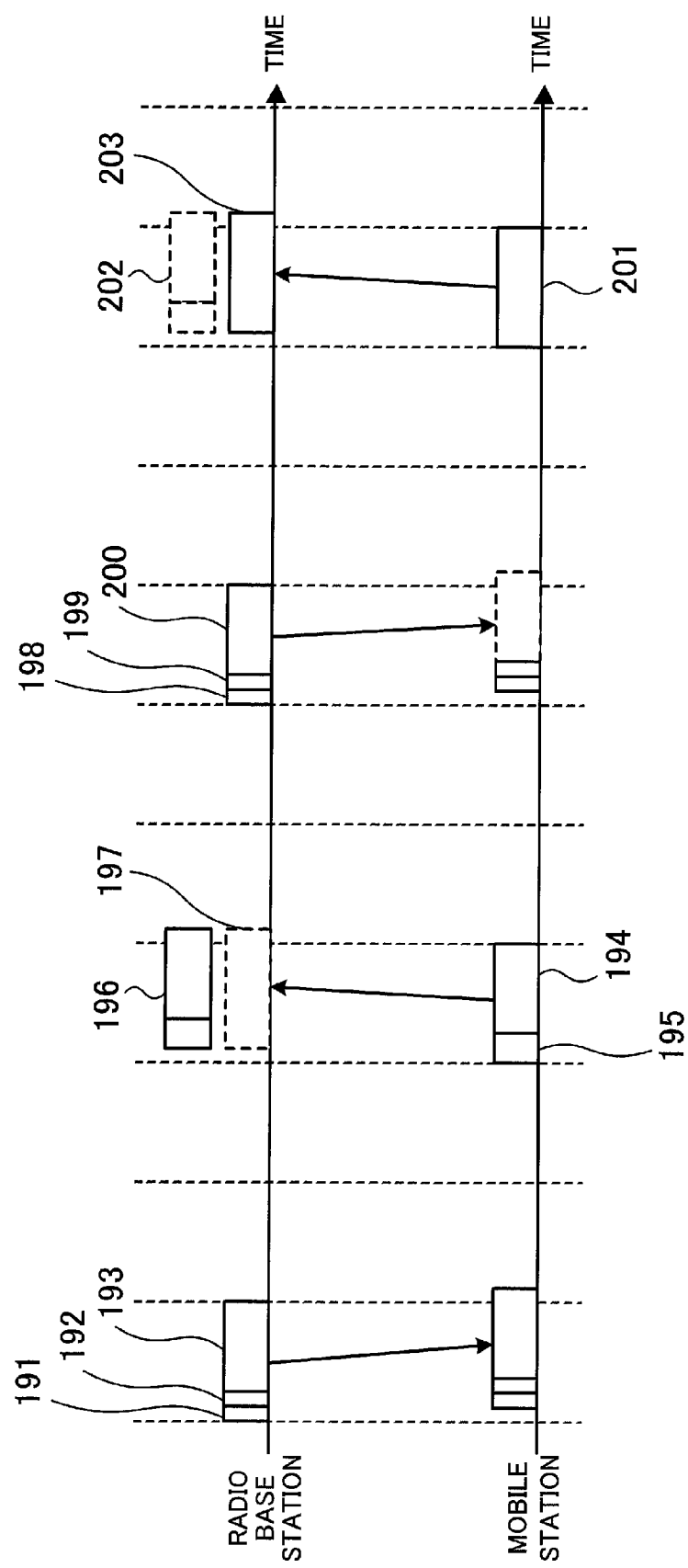
FIG. 20 illustrates the operation of a radio base station and a mobile station according to a sixth embodiment.

FIG. 20 illustrates the operation of the radio base station and the mobile station according to the sixth embodiment. In FIG. 20, downlink scheduling information 191 and 198, UL allocation grant 192 and 199, and downlink data 193 and 200 are indicated. In addition, uplink data 194 and 201 and an area 195 for storing ACK or NACK are indicated. PUSCH formats 196, 197, 202, and 203 in which the radio base station can try receiving are also indicated.

It is assumed that the mobile station succeeds in detecting the downlink scheduling information 191. Then the mobile station receives the downlink data 193 on the basis of the downlink scheduling information 191.

In addition, it is assumed that the mobile station succeeds in detecting the UL allocation grant 192. Then the mobile station sends the uplink data 194 to the radio base station on the basis of the UL allocation grant 192.

At this time the mobile station succeeds in detecting the downlink scheduling information 191, so the mobile station secures the area 195 for storing ACK or NACK in a PUSCH and sends the ACK or NACK to the radio base station.

The radio base station tries receiving data sent from the mobile station in the format 196 including the area 195 for ACK or NACK and the format 197 not including the area 195 for ACK or NACK. The radio base station succeeds in receiving the PUSCH in one of these two formats. In this example, the mobile station sends the PUSCH including the area 195, so the radio base station succeeds in receiving the PUSCH in the format 196 and fails to receive the PUSCH in the format 197. Success or failure in receiving is determined on the basis of, for example, detecting an error in uplink data.

It is assumed that the mobile station fails to detect the downlink scheduling information 198. In this case, the mobile station does not perform the process of receiving the downlink data 200.

In addition, it is assumed that the mobile station succeeds in detecting the UL allocation grant 199. Then the mobile station sends the uplink data 201 to the radio base station on the basis of the UL allocation grant 199.

At this time the mobile station does not receive the downlink data 200, so the mobile station does not secure an area for storing ACK or NACK in a PUSCH. Accordingly, the mobile station sends only the uplink data 201 to the radio base station.

The radio base station tries receiving data sent from the mobile station in the format 202 including an area for ACK or NACK and the format 203 not including an area for ACK or NACK. The radio base station succeeds in receiving the PUSCH in one of these two formats. In this example, the mobile station sends the PUSCH not including an area for ACK or NACK. Therefore, the radio base station succeeds in receiving the PUSCH in the format 203 and fails to receive the PUSCH in the format 202.

As stated above, the radio base station tries receiving data both in the transmission format including an area for ACK or NACK and in the transmission format not including an area for ACK or NACK. The mobile station may use these formats for sending.

As a result, even if uplink data is sent in the different transmission formats from the mobile station, the radio base station can receive the uplink data properly.

Figure 21:
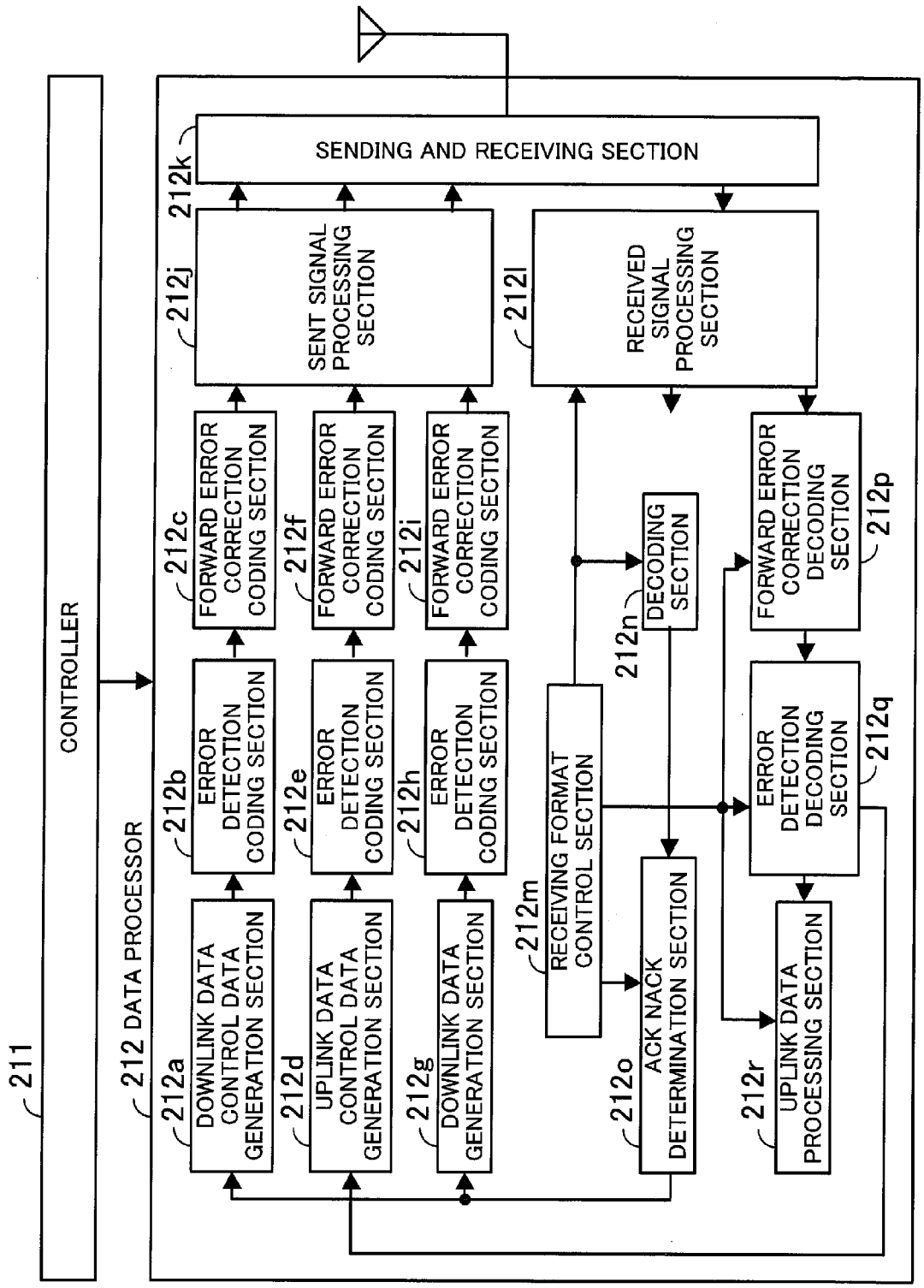
FIG. 21 is a functional block diagram of the radio base station.

FIG. 21 is a functional block diagram of the radio base station. Components in FIG. 21 have the same functions as those of the radio base station illustrated in FIG. 15 have. However, the radio base station illustrated in FIG. 21 differs from the radio base station illustrated in FIG. 15 in that it has a function for recognizing the format of data received from the mobile station. Only respects in which the radio base station illustrated in FIG. 21 differs from the radio base station illustrated in FIG. 15 will now be described.

With the radio base station illustrated in FIG. 21, unlike the radio base station illustrated in FIG. 15, a receiving format control section 212*m* controls a received signal processing section 2121, a decoding section 212*n*, an ACK NACK determination section 212*o*, a forward error correction decoding section 212*p*, an error detection decoding section 212*q*, and an uplink data processing section 212*r* so as to process received data both in the format including an area for ACK or NACK and in the format not including an area for ACK or NACK. The receiving format control section 212*m* makes the received signal processing section 2121, the decoding section 212*n*, the ACK NACK determination section 212*o*, the forward error correction decoding section 212*p*, and the uplink data processing section 212*r* adopt the format in which the error detection decoding section 212*q* does not detect an error in uplink data for performing a process.

Figure 22:
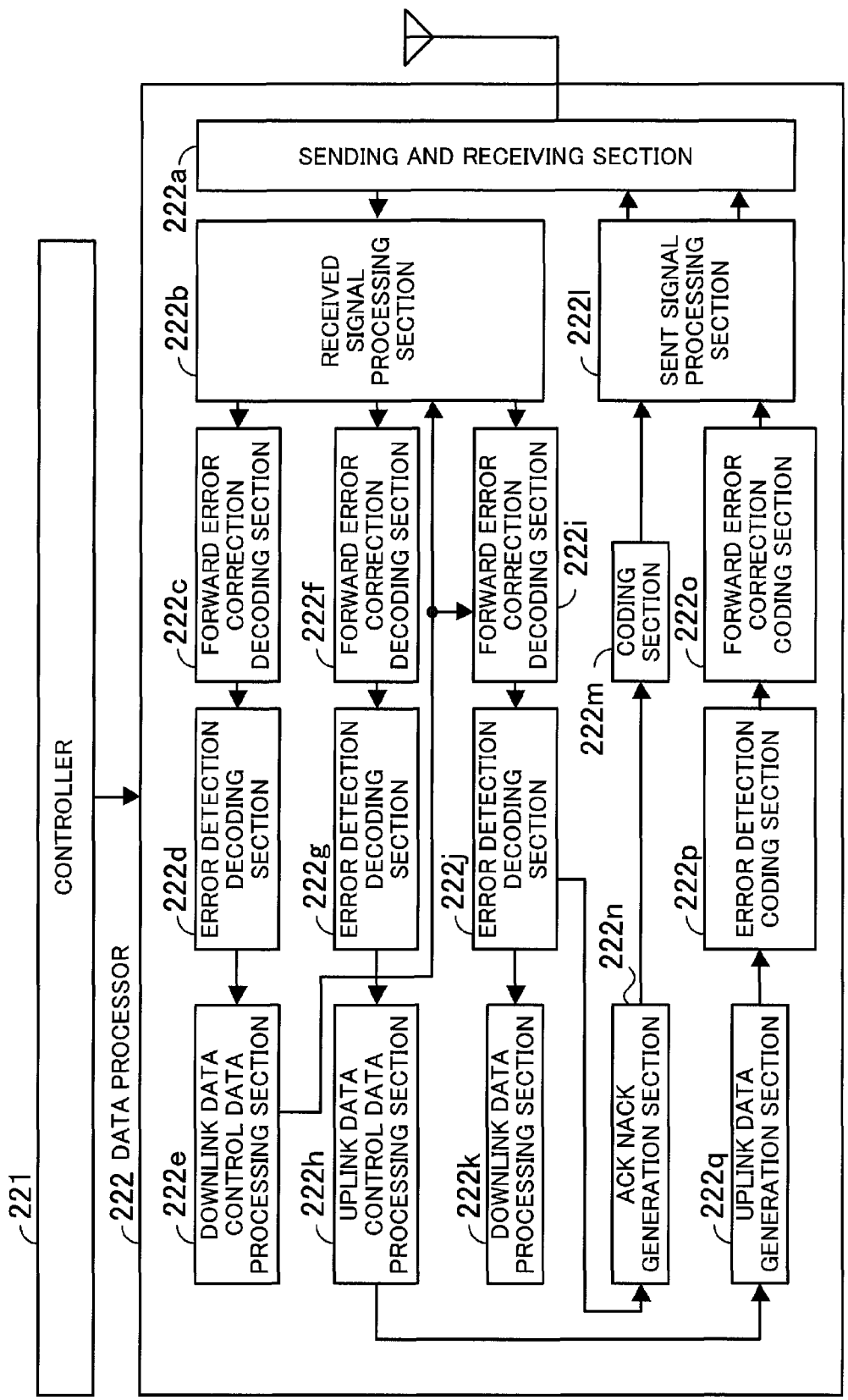
FIG. 22 is a functional block diagram of the mobile station.

FIG. 22 is a functional block diagram of the mobile station. Components in FIG. 22 have the same functions as those of the mobile station illustrated in FIG. 16 have. However, the mobile station illustrated in FIG. 22 differs from the mobile station illustrated in FIG. 16 in that it never secures an area for ACK or NACK. Only respects in which the mobile station illustrated in FIG. 22 differs from the mobile station illustrated in FIG. 16 will now be described.

When an ACK NACK generation section 222*n* of the mobile station illustrated in FIG. 22 performs error detection on downlink data, the ACK NACK generation section 222*n* generates ACK or NACK. The mobile station illustrated in FIG. 22 does not secure an area for ACK or NACK. Therefore, if the mobile station illustrated in FIG. 22 fails to detect downlink scheduling information, then the mobile station illustrated in FIG. 22 sends the radio base station a PUSCH including an area for ACK or NACK and a PUSCH not including an area for ACK or NACK.

The mobile station sends ACK or NACK to the radio base station according to a result of error detection on downlink data. Accordingly, as stated above, the mobile station sends the radio base station a PUSCH including an area for ACK or NACK and a PUSCH not including an area for ACK or NACK. That is to say, the mobile station uses the two transmission formats. The radio base station receives the PUSCHs sent from the mobile station in the two transmission formats, that is to say, in the transmission format including an area for ACK or NACK and the transmission format not including an area for ACK or NACK. As a result, even if a transmission format used by the mobile station is not standardized, the radio base station can receive uplink data properly.

A seventh embodiment of the present invention will now be described in detail with reference to the accompanying drawings. In the seventh embodiment, a mobile station does not time-multiplex ACK or NACK corresponding to downlink data and uplink data in a PUSCH when the mobile station sends a radio base station the ACK or NACK corresponding to the downlink data and the uplink data. The mobile station sends the ACK or NACK corresponding to the downlink data via a PUCCH assigned in advance or a PUCCH associated with a radio resource via which downlink data or downlink control data is sent, and sends uplink data via a PUSCH assigned by UL allocation grant.

Figure 23:
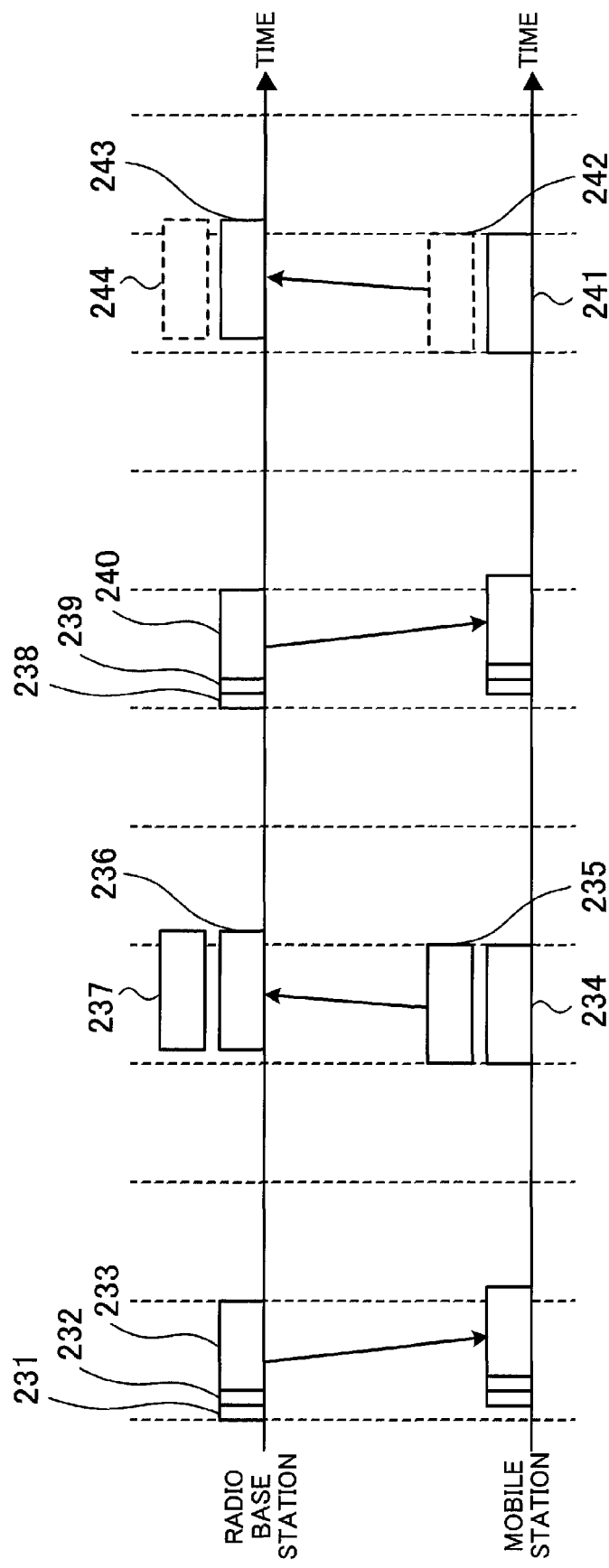
FIG. 23 illustrates the operation of a radio base station and a mobile station according to a seventh embodiment.

FIG. 23 illustrates the operation of the radio base station and the mobile station according to the seventh embodiment. In FIG. 23, downlink scheduling information 231 and 238, UL allocation grant 232 and 239, and downlink data 233 and 240 are indicated. In addition, PUSCHs 234, 236, 241, and 243 via which uplink data is sent and PUCCHs 235, 237, 242, and 244 via which ACK or NACK is sent are indicated.

It is assumed that the mobile station succeeds in detecting the downlink scheduling information 231. Then the mobile station receives the downlink data 233 on the basis of the downlink scheduling information 231. In addition, it is assumed that the mobile station succeeds in detecting the UL allocation grant 232. Then the mobile station sends uplink data on the basis of the UL allocation grant 232.

The mobile station receives the downlink data 233. Accordingly, the mobile station performs error detection on the downlink data 233 and sends the radio base station ACK or NACK which is a result of the error detection. The mobile station sends the ACK or NACK via the PUCCH 235 and sends uplink data to the radio base station via the PUSCH 234. That is to say, the mobile station multiplexes the ACK or NACK corresponding to the downlink data 233 and the uplink data in a frequency domain and sends them to the radio base station.

The radio base station tries receiving the ACK or NACK corresponding to the downlink data 233 via a PUCCH which is assigned in advance or which is associated with a radio resource via which downlink data or downlink control data is sent. The mobile station succeeds in detecting the downlink scheduling information 231, so the radio base station receives the ACK or NACK via the PUCCH 237. The radio base station also receives the uplink data via the PUSCH 236.

It is assumed that the mobile station fails to detect the downlink scheduling information 238. In this case, the mobile station does not perform the process of receiving the downlink data 240.

In addition, it is assumed that the mobile station succeeds in detecting the UL allocation grant 239. Then the mobile station sends uplink data via the PUSCH 241 on the basis of the UL allocation grant 239.

The mobile station does not perform the process of receiving the downlink data 240, so the mobile station does not send ACK or NACK to the radio base station. In this case, the mobile station sends nothing via the PUCCH 242.

The radio base station tries receiving ACK or NACK via the PUCCH 244. However, the mobile station sends nothing via the PUCCH 242, so the radio base station detects DTX. The radio base station receives uplink data via the PUSCH 243.

As stated above, a PUCCH and a PUSCH are used as radio resources for sending ACK or NACK corresponding to downlink data and uplink data, respectively, and are different from and independent of each other. Therefore, a mismatch does not occur between a PUSCH transmission format used by the mobile station for sending the uplink data and a PUSCH transmission format which the radio base station expects. In addition, the ACK or NACK corresponding to the downlink data is sent via the PUCCH regardless of whether uplink data is sent. Accordingly, the ACK or NACK corresponding to the downlink data can be sent or received independently of uplink data.

Figure 24:
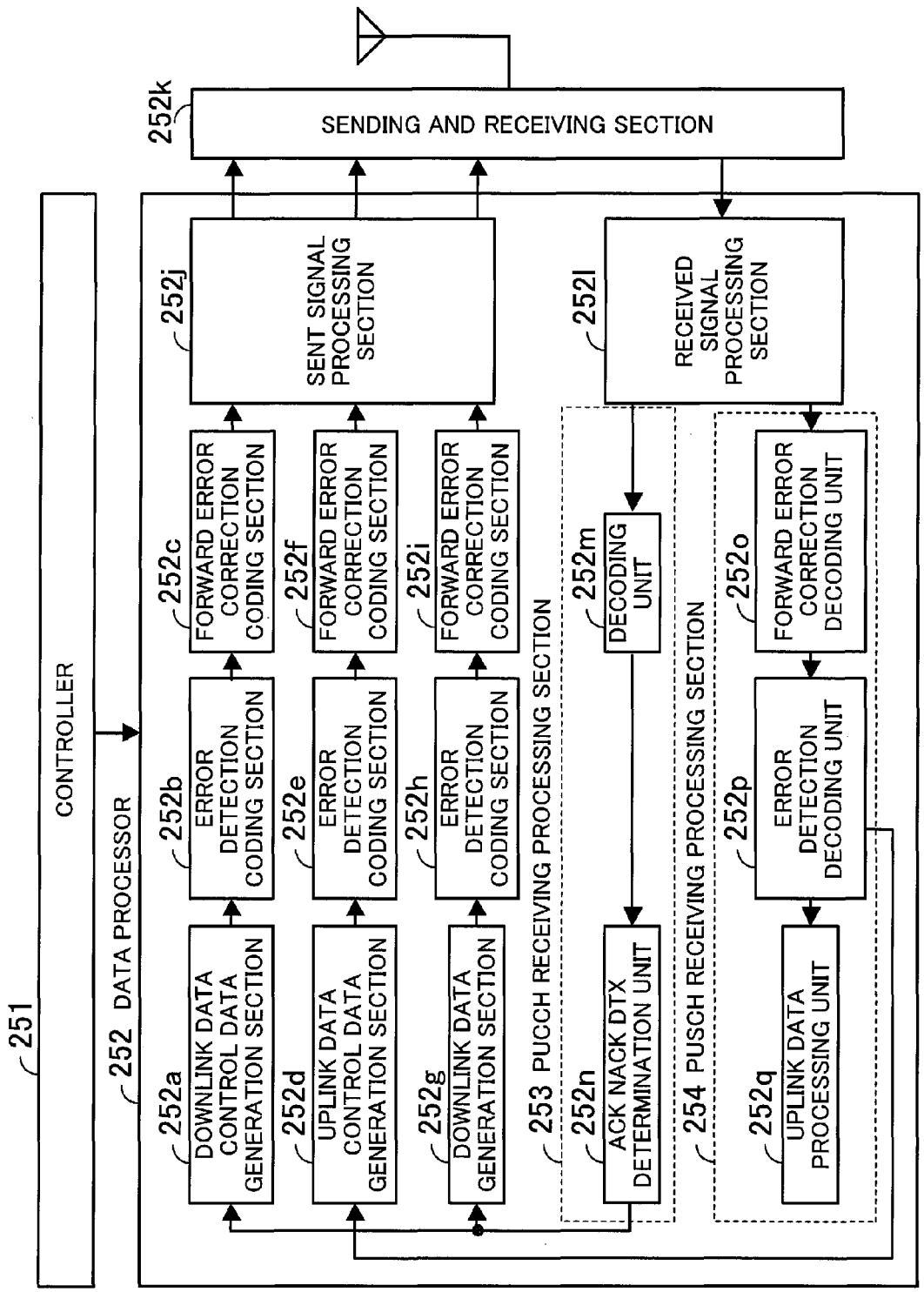
FIG. 24 is a functional block diagram of the radio base station.

FIG. 24 is a functional block diagram of the radio base station. Components in FIG. 24 have the same functions as those of the radio base station illustrated in FIG. 15 have. However, the radio base station illustrated in FIG. 24 differs from the radio base station illustrated in FIG. 15 in that its PUCCH receiving processing section 253 decodes and determines ACK, NACK, or DTX and that its PUSCH receiving processing section 254 performs the process of receiving uplink data. Only respects in which the radio base station illustrated in FIG. 24 differs from the radio base station illustrated in FIG. 15 will now be described.

A decoding unit 252m of the PUCCH receiving processing section 253 decodes data sent from the mobile station via a PUCCH. An ACK NACK DTX determination unit 252n determines on the basis of the decoded data whether it is ACK or NACK. If there is no decoded data, then the ACK NACK DTX determination unit 252n detects DTX.

A forward error correction decoding unit 252o of the PUSCH receiving processing section 254 performs forward error correction decoding on the uplink data sent from the mobile station via a PUSCH. An error detection decoding unit 252p performs error detection decoding on the uplink data sent from the mobile station via the PUSCH. An uplink data processing unit 252q processes the uplink data sent via the PUSCH.

Figure 25:
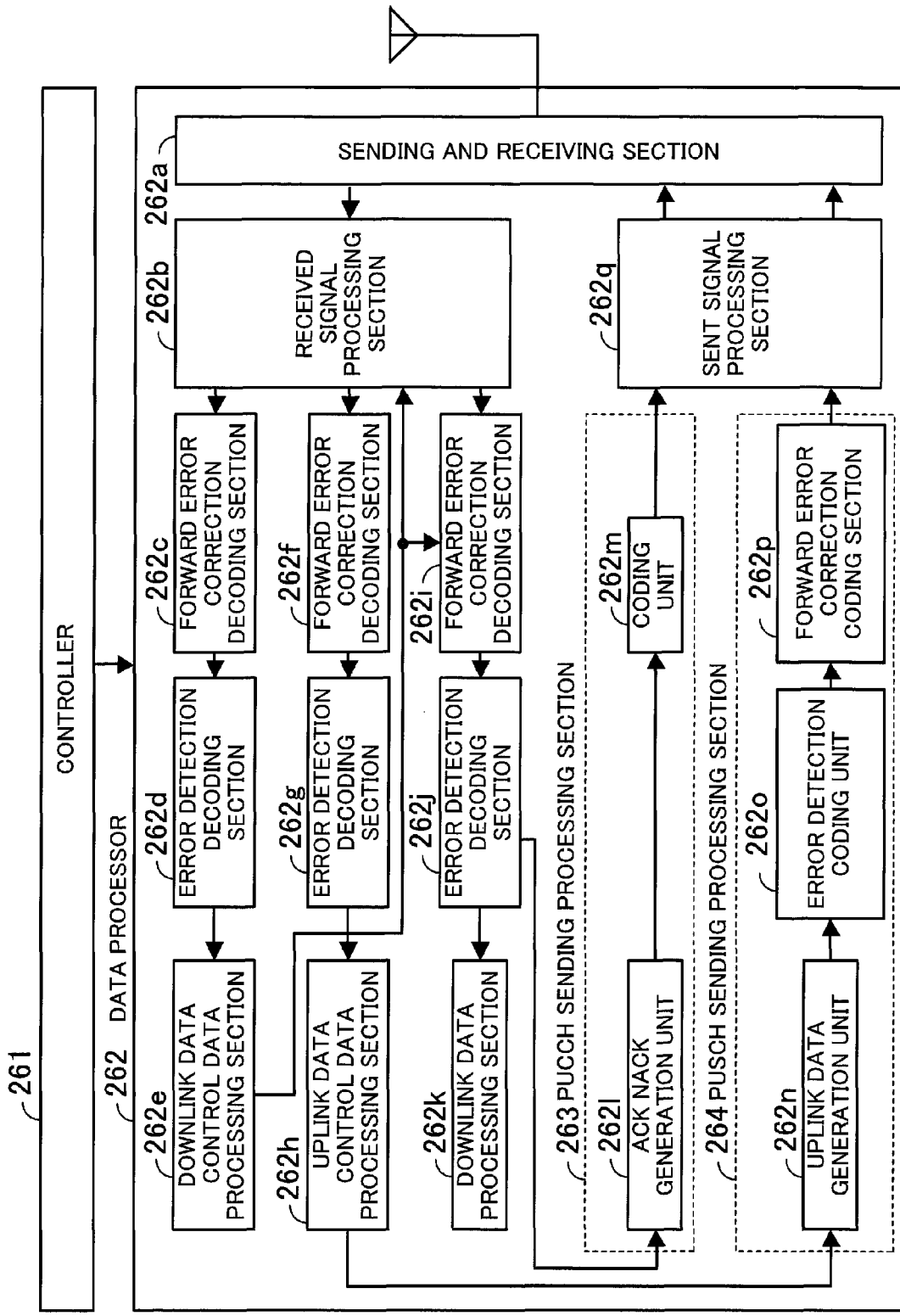
FIG. 25 is a functional block diagram of the mobile station.
Figure 26:
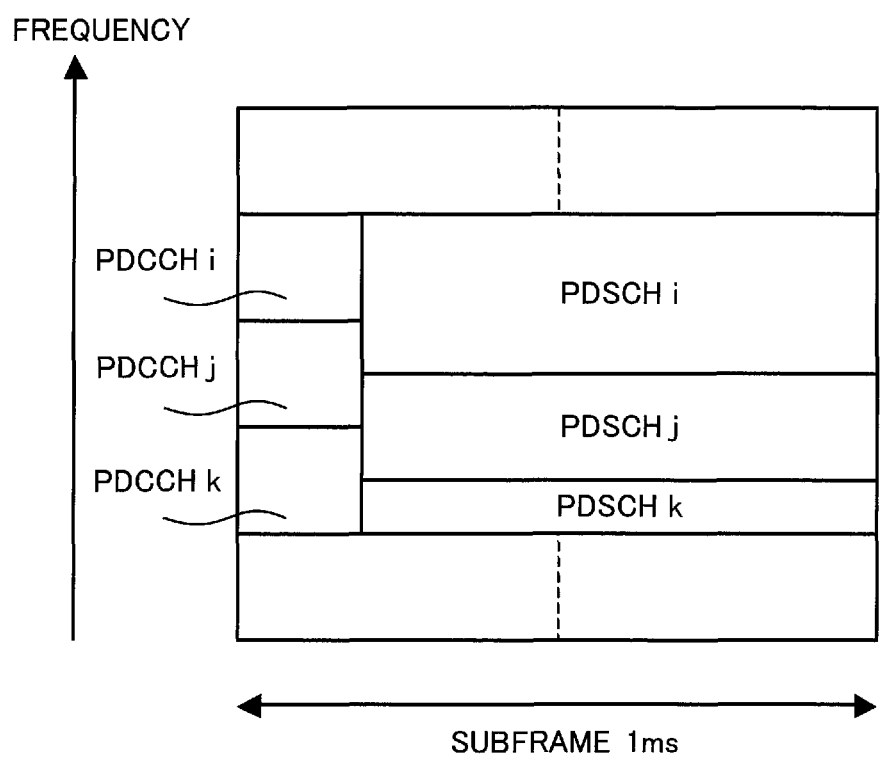
FIG. 26 illustrates PDCCHs and PDSCHs.
Figure 27:
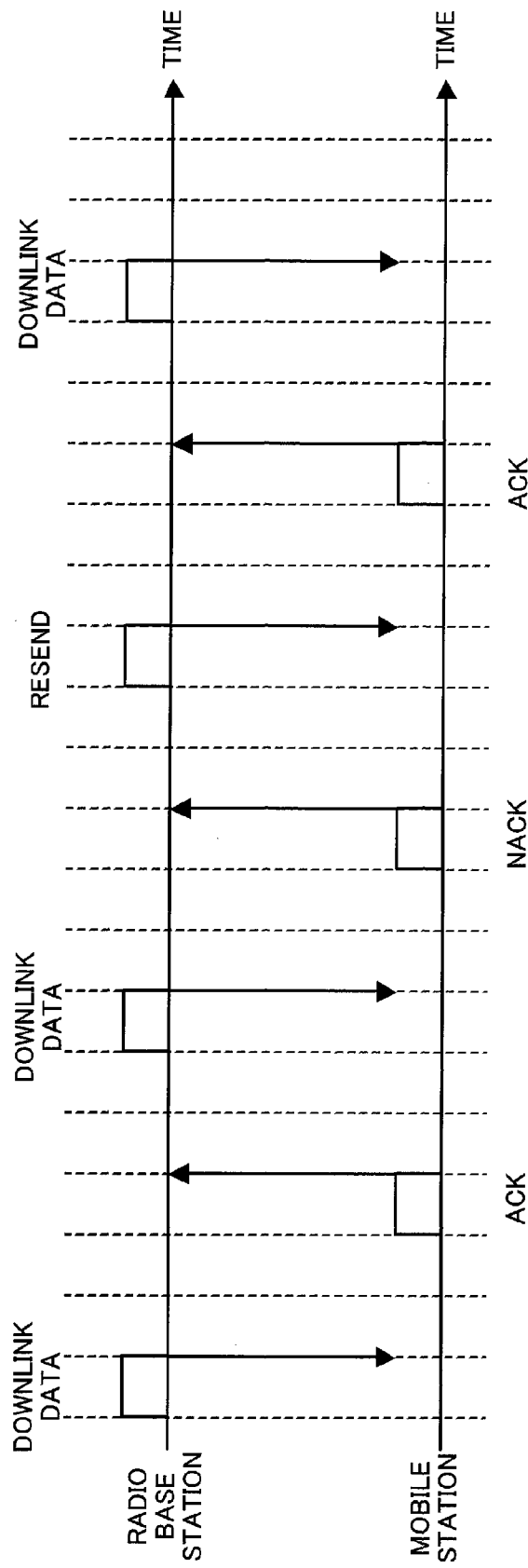
FIG. 27 illustrates the sending of downlink data and a response thereto.
Figure 28:
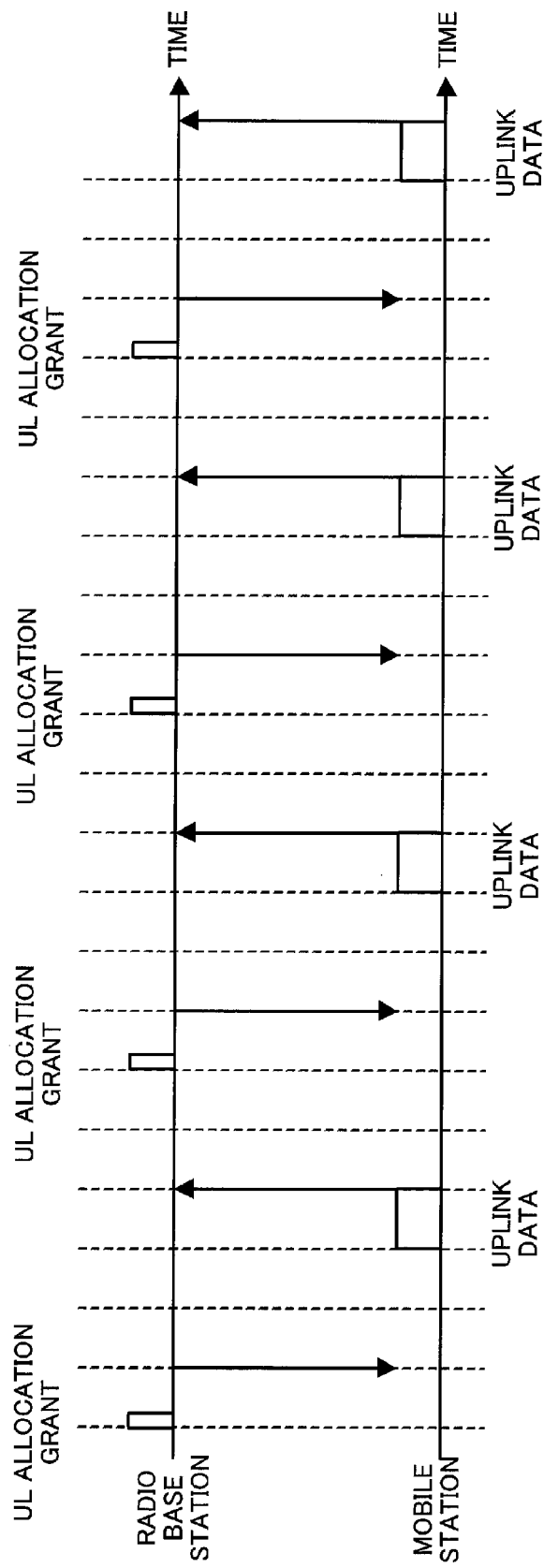
FIG. 28 illustrates UL allocation grant and uplink data sent on the basis thereof.
Figure 29:
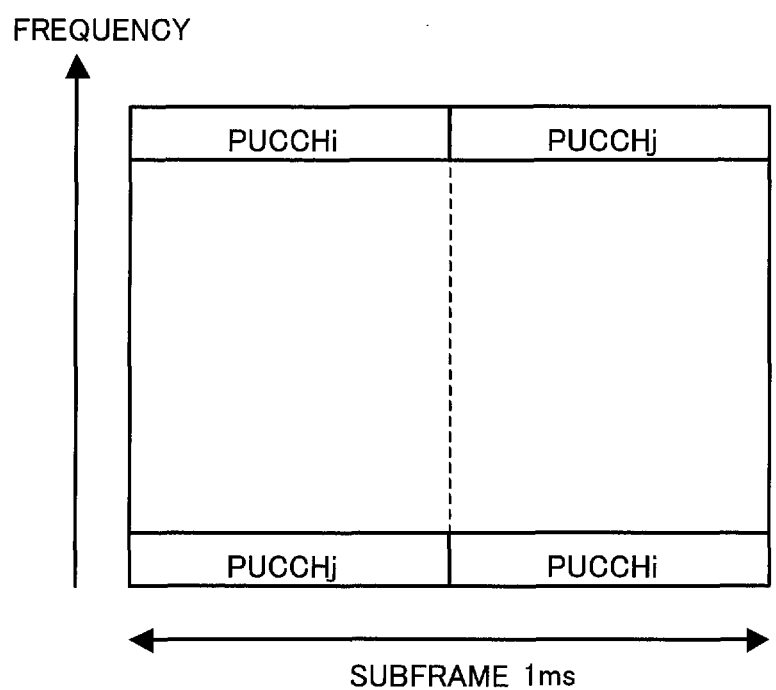
FIG. 29 is a view for describing a method for sending ACK or NACK in the case of uplink data not being sent.
Figure 30:
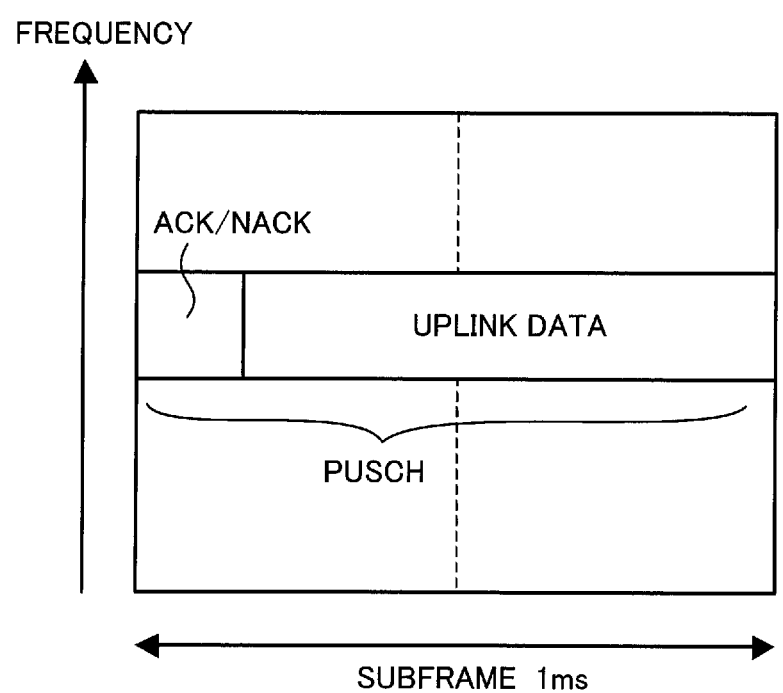
FIG. 30 is a view for describing a method for sending ACK or NACK in the case of uplink data being sent.

FIG. 25 is a functional block diagram of the mobile station. Components in FIG. 25 have the same functions as those of the mobile station illustrated in FIG. 16 have. However, the mobile station illustrated in FIG. 25 differs from the mobile station illustrated in FIG. 16 in that its PUCCH sending processing section 263 generates and encodes ACK or NACK and that its PUSCH sending processing section 264 performs the process of sending uplink data. Only respects in which the mobile station illustrated in FIG. 25 differs from the mobile station illustrated in FIG. 16 will now be described.

An ACK NACK generation unit 2621 of the PUCCH sending processing section 263 generates ACK or NACK on the basis of a result of error detection on downlink data. A coding unit 262m encodes the ACK or NACK generated and processes it so that it will be sent via the PUCCH.

An uplink data generation unit 262n of the PUSCH sending processing section 264 generates the uplink data. An error detection coding unit 262o performs error detection coding on the uplink data. A forward error correction coding unit 262p performs forward error correction coding on the uplink data and processes it so that it will be sent via the PUSCH.

As stated above, the mobile station sends ACK or NACK via a PUCCH and sends uplink data via a PUSCH. As a result, a mismatch does not occur between a PUSCH transmission format used by the mobile station for sending uplink data and a PUSCH transmission format which the radio base station expects. Therefore, the radio base station can receive the uplink data properly.

With the radio base station and the mobile station according to the present invention, the radio base station can receive data properly from the mobile station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A mobile station for performing radio communication with a radio base station, the mobile station comprising:
   an information generation section which generates information indicative of a result of error detection on a downlink signal received; and
   a sending section which sends the information via a physical uplink control channel, and sends uplink data via a physical uplink shared channel at a different transmission frequency from the physical uplink control channel and in a same transmission time period as the physical uplink control channel;
   wherein the information generation section and the sending section operate when the mobile station receives downlink scheduling information and uplink allocation grant in a same subframe.

2. A radio base station for performing radio communication with a mobile station, the radio base station comprising:
   an information receiving section which receives information indicative of a result of error detection on a downlink signal by the mobile station via a physical uplink control channel; and
   an uplink data receiving section which receives uplink data sent from the mobile station via a physical uplink shared channel at a different transmission frequency from the physical uplink control channel and in a same transmission time period as the physical uplink control channel;

wherein the information receiving section and the uplink data receiving section operate after a predetermined time when the radio base station sends downlink scheduling information and uplink allocation grant to the mobile station in a same subframe.

* * * * *